(12) United States Patent
Park et al.

(10) Patent No.: US 11,533,753 B2
(45) Date of Patent: Dec. 20, 2022

(54) ADAPTIVE TIME-VARYING FRAME PATTERN FOR FRAME BASED EQUIPMENT (FBE) CHANNEL ACCESS

(71) Applicant: QUALCOMM INCORPORATED, San Diego, CA (US)

(72) Inventors: Sungwoo Park, Seoul (KR); Arumugam Chendamarai Kannan, San Diego, CA (US); Srinivas Yerramalli, Hyderabad (IN); Xiaoxia Zhang, San Diego, CA (US); Jing Sun, San Diego, CA (US); Vinay Chande, San Diego, CA (US); Tao Luo, San Diego, CA (US); Aleksandar Damnjanovic, Del Mar, CA (US); Giovanni Chisci, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 37 days.

(21) Appl. No.: 17/249,732

(22) Filed: Mar. 10, 2021

(65) Prior Publication Data
US 2021/0298074 A1 Sep. 23, 2021

Related U.S. Application Data

(60) Provisional application No. 62/991,041, filed on Mar. 17, 2020.

(51) Int. Cl.
*H04W 74/08* (2009.01)
*H04B 17/336* (2015.01)

(52) U.S. Cl.
CPC ...... *H04W 74/0808* (2013.01); *H04B 17/336* (2015.01)

(58) Field of Classification Search
CPC .................. H04W 74/0808; H04B 17/336
See application file for complete search history.

(56) References Cited

U.S. PATENT DOCUMENTS

| 10,791,569 | B2 * | 9/2020 | Salem | H04W 16/14 |
| 2017/0318607 | A1 * | 11/2017 | Tiirola | H04W 4/10 |
| 2020/0037354 | A1 * | 1/2020 | Li | H04W 74/0808 |
| 2020/0305191 | A1 * | 9/2020 | Moon | H04W 72/1289 |
| 2021/0084683 | A1 * | 3/2021 | Li | H04W 74/0833 |
| 2021/0105815 | A1 * | 4/2021 | Salem | H04W 72/042 |
| 2021/0378012 | A1 * | 12/2021 | Kusashima | H04W 74/0816 |

* cited by examiner

*Primary Examiner* — Harry H Kim
(74) *Attorney, Agent, or Firm* — Haynes and Boone, LLP

(57) ABSTRACT

Wireless communications systems and methods related to communications in a network are provided. A first wireless communication device may communicate to a second wireless communication device, a modification to a time parameter associated with at least one of a minimum idle period (MIP) of a frame period or a maximum channel occupancy time (MCOT) of the frame period. Additionally, the first wireless communication device may communicate with the second wireless communication device, a communication signal during the frame period based on the modification to the time parameter.

28 Claims, 12 Drawing Sheets

|  | Time-varying frame pattern 502 | Time-varying frame pattern 504 | Time-varying frame pattern 506 | Time-varying frame pattern 508 | Time-varying frame pattern 510 |
| --- | --- | --- | --- | --- | --- |
| Frame period | Fixed | Time-varying | Time-varying | Time-varying | Time-varying |
| Maximum COT (MCOT) | Time-varying | Fixed | Time-varying | Time-varying | Time-varying |
| Minimum idle period (MIP) | Time-varying | Time-varying | Fixed | Time-varying | Time-varying |
| MCOT-to-MIP ratio | Time-varying | Time-varying | Time-varying | Fixed | Time-varying |

500

FIG. 5 ive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

ADAPTIVE TIME-VARYING FRAME PATTERN FOR FRAME BASED EQUIPMENT (FBE) CHANNEL ACCESS

CROSS REFERENCE TO RELATED APPLICATIONS & PRIORITY CLAIM

The present application claims priority to and the benefit of U.S. Provisional Patent Application No. 62/991,041 filed Mar. 17, 2020, which is hereby incorporated by reference in its entirety as if fully set forth below and for all applicable purposes.

TECHNICAL FIELD

This application relates to wireless communication systems, and more particularly to modifying a frame pattern for frame based equipment (FBE) channel access.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology. For example, NR is designed to provide a lower latency, a higher bandwidth or a higher throughput, and a higher reliability than LTE. NR is designed to operate over a wide array of spectrum bands from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

One approach to avoiding collisions when communicating in a shared spectrum or an unlicensed spectrum is to use a listen-before-talk (LBT) procedure to ensure that the shared channel is clear before transmitting a signal in the shared channel. For example, a transmitting node may perform LBT to determine whether there are active transmissions in the channel. If the LBT results in a LBT pass, the transmitting node may transmit a preamble to reserve a channel occupancy time (COT) in the shared channel and may communicate with a receiving node during the COT.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of In an aspect of the disclosure, a method of wireless communication includes communicating, by a first wireless communication device with a second wireless communication device, a modification to a time parameter associated with at least one of a minimum idle period (MIP) of a frame period or a maximum channel occupancy time (MCOT) of the frame period; and communicating, by the first wireless communication device with the second wireless communication device, a communication signal during the frame period based on the modification to the time parameter.

In an aspect of the disclosure, an apparatus of wireless communication includes a transceiver configured to: communicate, by a first wireless communication device with a second wireless communication device, a modification to a time parameter associated with at least one of a minimum idle period (MIP) of a frame period or a maximum channel occupancy time (MCOT) of the frame period; and communicate, by the first wireless communication device with the second wireless communication device, a communication signal during the frame period based on the modification to the time parameter.

In an additional aspect of the disclosure, a computer-readable medium having program code recorded thereon, the program code includes code for causing a first wireless communication device to communicate with a second wireless communication device, a modification to a time parameter associated with at least one of a minimum idle period (MIP) of a frame period or a maximum channel occupancy time (MCOT) of the frame period; and code for causing the first wireless communication device to communicate with the second wireless communication device, a communication signal during the frame period based on the modification to the time parameter.

In an additional aspect of the disclosure, an apparatus includes means for means for communicating, with a second wireless communication device, a modification to a time parameter associated with at least one of a minimum idle period (MIP) of a frame period or a maximum channel occupancy time (MCOT) of the frame period; and means for communicating, with the second wireless communication device, a communication signal during the frame period based on the modification to the time parameter.

Other aspects, features, and embodiments of the present disclosure will become apparent to those of ordinary skill in the art, upon reviewing the following description of specific, exemplary embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 5 illustrates a table providing a plurality of time-varying frame patterns according to one or more aspects of the present disclosure.

DETAILED DESCRIPTION

Figure 1:
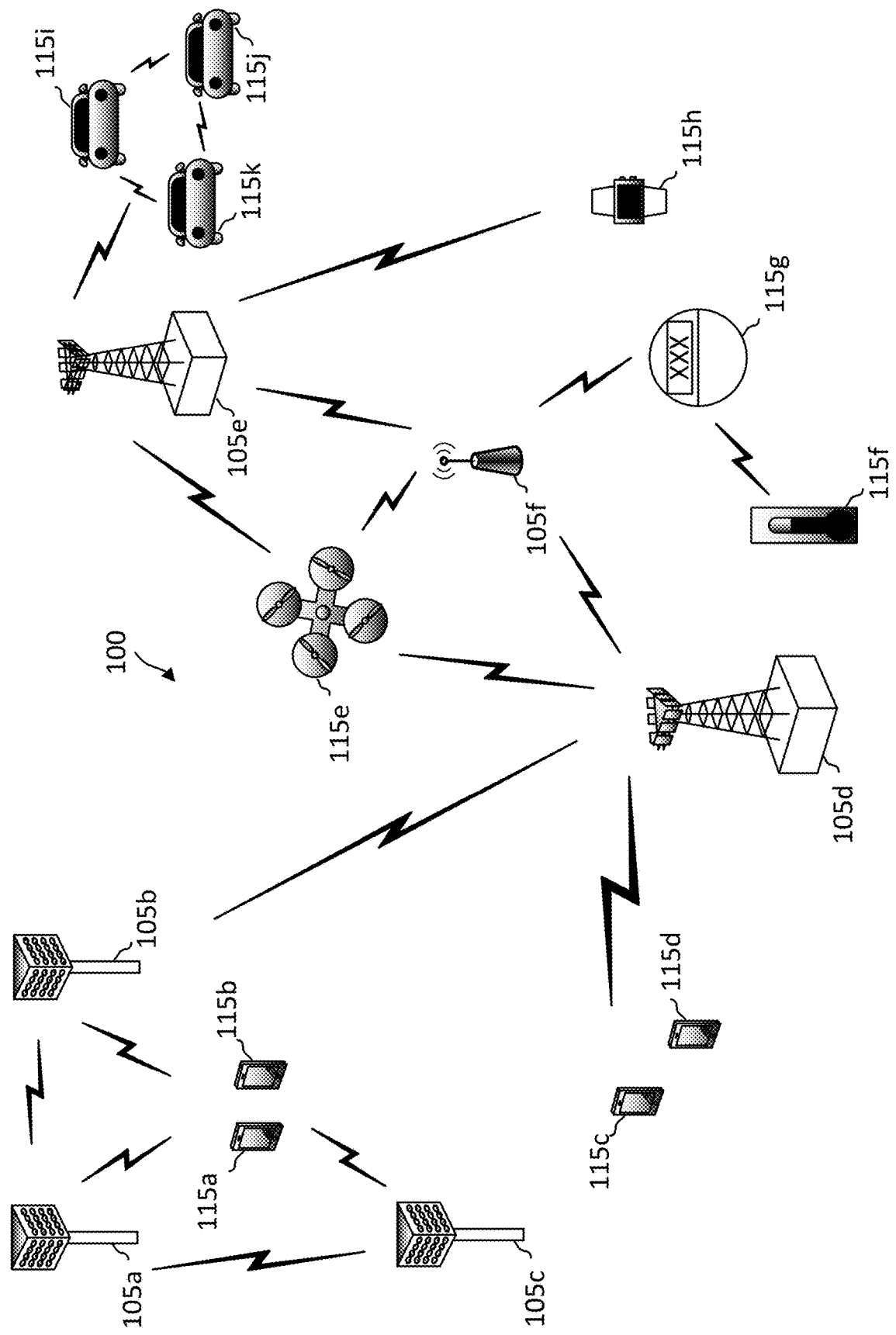
FIG. 1 illustrates a wireless communication network according to one or more aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form to avoid obscuring such concepts.

This disclosure relates generally to wireless communications systems, also referred to as wireless communications networks. In various instances, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an Ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including control with strong security to safeguard personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing (SCS), may efficiently address operating diverse services across diverse spectrum and diverse deployments. For example, in various outdoor and macro coverage deployments of less than 3 GHz FDD/TDD implementations, SCS may occur with 15 kHz, for example over 5, 10, 20 MHz, and the like bandwidth (BW). For other various outdoor and small cell coverage deployments of TDD greater than 3 GHz, SCS may occur with 30 kHz over 80/100 MHz BW. For other various indoor wideband implementations, using a TDD over the unlicensed portion of the 5 GHz band, the SCS may occur with 60 kHz over a 160 MHz BW. Finally, for various deployments transmitting with mmWave components at a TDD of 28 GHz, the SCS may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects or examples set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may include at least one element of a claim.

In Frame Based Equipment (FBE), channel sensing may be performed at fixed time instants (e.g., contention period or clear channel assessment (CCA)). For example, the channel sensing may be performed once per frame period, and if the channel is busy, the wireless communication device (e.g., BS or UE) backs off for a fixed time period and senses the channel again after this period. If the channel is available, the wireless communication device may use the next fixed frame period (FFP) for communicating DL and/or UL transmissions for up to a maximum channel occupancy time (MCOT). The MCOT may also be referred to as a transmission period, which can be used for UL and/or DL transmissions.

Operators may share a channel and perform LBT before transmitting on the channel. An operator may correspond to a BS (e.g., BSs 105). Problems may arise if multiple operators (e.g., a BS A and a BS B) use the same unlicensed bands with FBE, and the FFPs of the operators are the same (or one is a multiple of the other) and about aligned in time. For example, if the FFPs of two operators are synchronized, the start of the FFPs start at about the same time for both operators and the operators may perform LBT at about the same time (e.g., before the start of the next PPP). If the channel is not occupied (e.g., no data transmission on the channel), the LBTs may result in an LBT pass for both operators. Accordingly, each operator may start transmitting data at the start of the next FFP, potentially interfering with the transmission of the other operator. In this example, both operators may interfere with each other during each FFP because the operators may start transmitting data at about the same time for every frame. It may be desirable to reduce the interference between operators.

In another example, if the FFPs of the two operators are not synchronized, the start of the FFPs may start at different times for both operators. The start of the FFPs of a first operator and the start of the FFPs of a second operator may be staggered, such that the first operator may pass LBT and reserve a channel occupancy time (COT) at every frame, and the LBT of the second operator may always fail based on the first operator's transmission. For example, if the first operator passes LBT before a first FFP, then the first operator may start to transmit data during a second FFP, and the channel is now occupied. If the second operator performs LBT after the first operator performs LBT, but before the first operator is finished transmitting the data during the second FFP, the LBT of the second operator may fail. The second operator may determine that the channel is already occupied, and accordingly does not transmit data. This process may repeat every FFP for these two operators, so the second operator may be "starved" from channel access and not able to transmit data on the channel at all. It may be desirable for each of the operators to have access to the channel for data transmission.

The present disclosure provides techniques for reducing interference between multiple operators and/or preventing an operator from being starved and not able to transmit data. In some aspects, the BS 105 may determine to vary at least one of the frame period, an MCOT, a minimum idle period (MIP), or the MCOT-to-MIP ratio over time to, for example, reduce interference or starvation of network access. The MCOT-to-MIP ratio may refer to a ratio of the MCOT to the MIP. An FBE-frame structure may include a duration of at least one of a frame period, an MCOT, an MIP, and/or the MCOT-to-MIP ratio of a frame in FBE. The FBE-frame structure may be time-varying with respect to a time parameter associated with one or more of the frame period, the MCOT, the MIP, or the MCOT-to-MIP ratio, and the time-varying FBE-frame pattern may be determined by operators independently or in coordination. The time-varying frame patterns across different operators may be different opportunistically, even with no coordination between the operators. An FBE-frame pattern may refer to a time-varying pattern of an FBE-frame structure over time in the present disclosure.

FIG. 1 illustrates a wireless communication network 100 according to one or more aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-

105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support communications with ultra-reliable and redundant links for devices, such as the UE 115e. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as vehicle-to-vehicle (V2V) communications among the UEs 115i-115k, vehicle-to-everything (V2X) communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the SCS between adjacent subcarriers may be fixed, and the total number of subcarriers (K) may be dependent on the system BW. The system BW may also be partitioned into subbands. In other instances, the SCS and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes an UL subframe in an UL frequency band and a DL subframe in a DL frequency band. A subframe may also be referred to as a slot. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate an UL channel Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. An UL-centric subframe may include a longer duration for UL communication than for DL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB, which may be transmitted in the physical broadcast channel (PBCH). The MIB may include system information for initial network access and scheduling information for RMSI and/or OSI. After decoding the MIB, the UE 115 may receive RMSI, OSI, and/or one or more system information blocks (SIBs). The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS. In some aspects, SIB1 may contain cell access parameters and scheduling information for other SIBs.

After obtaining the MIB, the RMSI and/or the OSI, the UE 115 can perform a random access procedure to establish a connection with the BS 105. After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit an UL communication signal to the BS 105 via a PUSCH and/or PUCCH according to an UL scheduling grant. In some aspects, the BS 105 may communicate with a UE 115 using HARQ techniques to improve communication reliability, for example, to provide a URLLC service.

A network may operate over a licensed frequency band, a shared frequency band, and/or an unlicensed frequency band, for example, at about 3.5 gigahertz (GHz), sub-6 GHz or higher frequencies in the mmWave band. The network 100 may partition a frequency band into multiple channels, each occupying about 20 megahertz (MHz). The BSs 105 and the UEs 115 may be operated by multiple network operating entities sharing resources in the shared or unlicensed frequency spectrum and may perform an LBT procedure (e.g., clear channel assessment (CCA)) prior to communicating to determine whether the channel is available. In some aspects, the BS 105 may employ an LBT procedure to reserve a COT in the shared medium for communications. A COT may refer to an amount of time a station can send frames when it has won contention for the wireless medium. In some aspects, a COT may also be referred to as a transmission opportunity (TXOP). Each COT may include a plurality of slots and one or more LBT or CCA periods.

The BS 105 may perform an LBT in the frequency band prior to transmitting in the frequency band and may transmit in one or more channels based on the LBT result. The BS 105 may perform an LBT based on energy detection and/or signal detection. The LBT may result in an LBT pass if the channel signal energy is below a threshold and/or no reservation signal is detected. Alternatively, the LBT may result in a failure if the channel signal energy is above a threshold and/or a reservation signal is detected. If the channel is available (performance of the LBT results in an LBT pass), the BS 105 may perform a DL transmission, receive an UL transmission from a UE 115, and/or schedule a UE 115 for data transmission and/or reception within a COT. If the channel is not available (performance of the LBT results in an LBT fail), the BS 105 may back off and perform the LBT procedure again at a later point in time. Additionally, the UE 115 may employ an LBT procedure (e.g., based on energy and/or signal detection) to ensure that the shared channel is clear before transmitting a signal in the shared channel. If the channel is available (performance of the LBT results in a LBT pass), the UE may perform an UL transmission. If the channel is not available (performance of the LBT results in a LBT fail), the UE may back off and perform the LBT procedure again at a later point in time.

Two broad types of LBT schemes may include Load Based Equipment (LBE) and FBE. In the LBE approach, the channel sensing may be performed at any time instant and random back-off (with a fixed or variable size contention window) is used if the channel is found busy. In FBE, channel sensing may be performed at fixed time instants (e.g., contention period or CCA). For example, the channel sensing may be performed once per frame period, and if the channel is busy, the wireless communication device (e.g., BS or UE) backs off for a fixed time period and senses the channel again after this period. If the channel is available, the wireless communication device may use the next FFP for communicating DL and/or UL transmissions for up to a MCOT, which may also be referred to as a transmission period and can be used for UL and/or DL transmissions.

Figure 2:
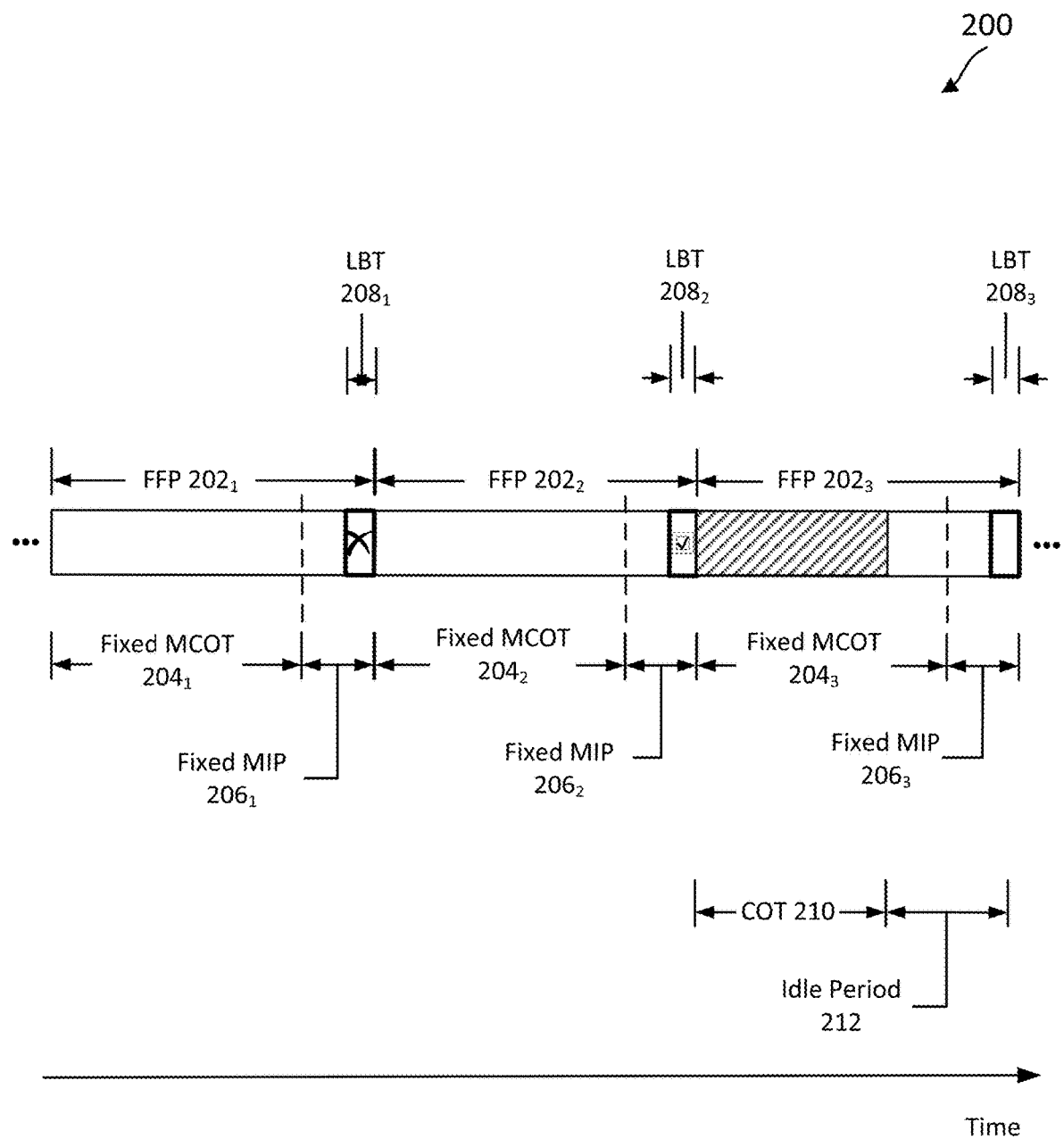
FIG. 2 illustrates an example frame based equipment (FBE) scheme.

FIG. 2 illustrates an example FBE scheme 200. The scheme 200 may be employed by the BS 105 and the UE 115 in a network such as the network 100 for communications. The x-axis represents time in some constant units. In FIG. 2, a fixed frame period (FFP) 202 includes a maximum channel occupancy time (MCOT) 204 and a minimum idle period (MIP) 206. Each FFP 202 includes a contention period during which a plurality of operators may contend for the shared medium and perform an LBT 208. The contention period may occur during the MIP 206 of the FFP 202.

Additionally, an FFP 202 may be fixed or configurable by the network 100. In some aspects, the FFP is configured from the range of about 1 ms to about 10 ms (e.g., 1, 2, 2.5, 4, 5, or 10 ms). The contention period, the FFP, the MCOT, and/or the MIP may have fixed durations and/or predetermined times. In some aspects, each contention period may include one or more OFDM symbols, and each FFP may include one or more subframes, slots, or TTIs. In some aspects, the FFP may be defined in units of slots (e.g., about 250 microseconds (μs) long). The FFP structure may be pre-determined and known by all network operating entities sharing the shared spectrum. In some aspects, the network operating entities are time-synchronized when operating in the shared spectrum. In some aspects, the network operating entities are not time-synchronized when operating in the shared spectrum.

Before a BS transmits a frame, the BS performs an LBT before the start of the frame. For example, before the BS transmits data during the FFP 202$_2$, the BS may perform an LBT 208$_1$ in a frequency band and contend for the shared medium during a contention period. The BS may perform the LBT 208$_1$ during the MIP 206$_1$ in the previous FFP 202$_1$. Based on a failed LBT 208$_1$ (the LBT 208$_1$ results in an LBT fail, as indicated by the "X" mark corresponding to the LBT 208$_1$), the BS skips the MCOT 204$_2$ of the FFP 202$_2$ and accordingly does not transmit data during the MCOT 204$_2$. The BS waits until the next contention period (during the MIP 206$_2$ in the FFP 202$_2$) to contend for the medium again and performs an LBT 208$_2$ before the start of the FFP 202$_3$. Based on a successful LBT 208$_2$ (the LBT 208$_2$ results in an LBT pass, as indicated by the checkmark corresponding to the LBT 208$_2$), the BS may reserve a COT 210 in the frequency band and communicate DL and/or UL signals during the COT 210.

The UE 115 may receive DL data from the BS 105 and transmit feedback for the DL data to the BS 105. The feedback may be an ACK indicating that reception of the DL data by the UE is successful (e.g., received the DL data without error) or may be a NACK indicating that reception of the DL data by the UE is unsuccessful (e.g., including an error or failing an error correction). The pattern-filled boxes of FIG. 2 may represent transmissions of DCI, DL data, UL data, an acknowledgement (ACK), and/or a negative-acknowledgement (NACK) in corresponding slots. While an entire slot is pattern-filled, in aspects, a transmission may occur only in a corresponding portion of the slot. The COT 210 may start at a beginning of the FFP 202$_3$ and a duration of the COT 210 may be dependent on the data load. In the example illustrated in FIG. 2, the duration of the COT 210 is not greater than a duration of the MCOT 204. Accordingly, an idle period 212 may be between an end of the COT 210 and an end of the FFP 202$_3$. In other examples, if the BS has a large amount of data to transmit that would exceed the MCOT 204$_3$, the BS transmits data until the end of the MCOT 204$_3$ and then performs LBT again before the start of the next FFP before continuing the data transmission.

The present disclosure provides techniques for reducing interference between multiple operators and/or preventing an operator from being starved and not able to transmit data. In some aspects, the BS 105 may determine to vary at least one of the frame period, the MCOT, the MIP, or the MCOT-to-MIP ratio over time to, for example, reduce interference or starvation of network access. The MCOT-to-MIP ratio may refer to a ratio of the MCOT to the MIP. An FBE-frame structure may include a duration of at least one of a frame period, an MCOT, an MIP, and/or the MCOT-to-MIP ratio of a frame in FBE. The FBE-frame structure may be time-varying with respect to a time parameter associated with one or more of the frame period, the MCOT, the MIP, or the MCOT-to-MIP ratio, and the time-varying FBE-frame pattern may be determined by operators independently or in coordination. The time-varying frame patterns across different operators may be different opportunistically, even with no coordination between the operators. An FBE-frame pattern may refer to a time-varying pattern of an FBE-frame structure over time in the present disclosure.

In some aspects, the BS 105 may transmit to the UE 115, a modification to a time parameter associated with at least one of an MIP of a frame period or an MCOT of the frame period. A time parameter associated with an MIP may indicate a duration of the MIP, and a modification to the time parameter may modify a duration of the MIP of one or more frame periods. For example, the modification to the time parameter associated with the MIP may increase or decrease the MIP of one or more frame periods compared to a previous MIP. Additionally, a time parameter associated with an MCOT may indicate a duration of the MCOT, and a modification to the time parameter may modify a duration of the MCOT of one or more frame periods. For example, the modification to the time parameter associated with the MCOT may increase or decrease the MCOT of one or more frame periods compared to a previous MCOT.

A time-varying frame period, MCOT, MIP, and MCOT-to-MIP ratio may refer to a duration of the frame period, MCOT, MIP, and MCOT-to-MIP ratio, respectively, varying with time. The BS 105 may transmit a time-varying frame pattern to the UE 115 in the cell using a variety of techniques. For example, the BS 105 may transmit the modification to the time parameter associated with the MIP of the frame period and/or the MCOT of the frame period via RMSI, a UE-specific RRC message, etc. The UE 115 may receive the modification to the time parameter and determine, based on the modification, the FBE-frame pattern. In some instances, the UE 115 may transmit to the BS 105, an UL communication signal during the frame period based on the modification to the time parameter. The BS 105 may receive the UL communication signal during the frame period based on the modification to the time parameter. In some instances, the BS 105 may transmit to the UE 115, a DL communication signal during the frame period based on the modification to the time parameter. The UE 115 may receive the DL communication signal during the frame period based on the modification to the time parameter.

The randomization of the frame period, MCOT, MIP, and/or MCOT-to-MIP ratio of a frame pattern used by a first operator (e.g., a BS 105) may increase the likelihood that a second operator operating in the same channel may pass an LBT and be able to transmit a communication signal in the channel. For example, the first operator's MCOT and/or MIP of a frame period may be shorter or longer than the second operator's MCOT and/or MIP of a frame period at random times, thus reducing the likelihood that the first and second operators will transmit communication signals at about the same time and interfere with each other and/or reducing the likelihood that one operator will starve the other operator from transmitting any communication signals in the channel.

Figure 3:
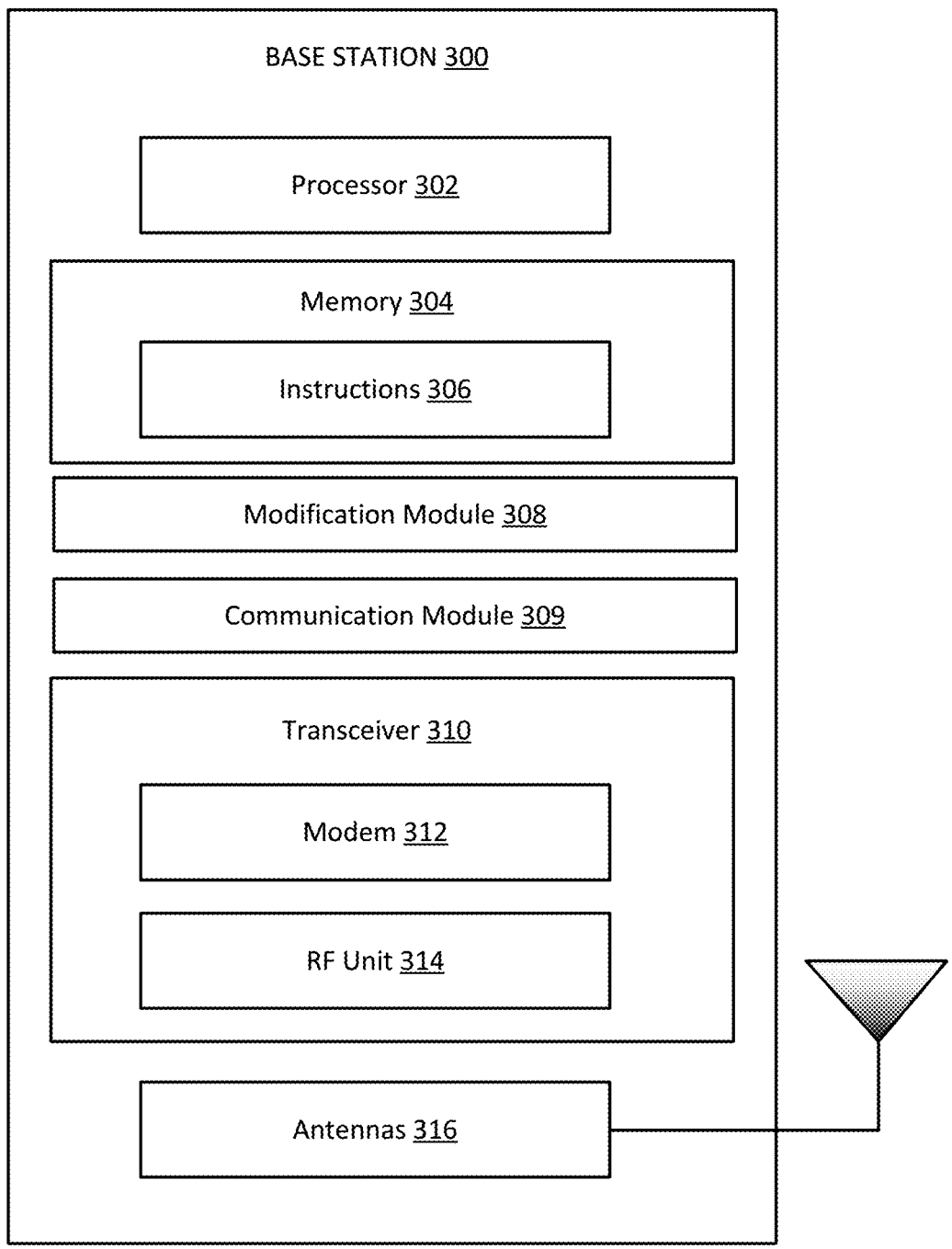
FIG. 3 is a block diagram of a base station (BS) according to one or more aspects of the present disclosure.

FIG. 3 is a block diagram of an example BS 300 according to one or more aspects of the present disclosure. The BS 300 may be a BS 105 as discussed above in relation to FIG. 1. As shown, the BS 300 may include a processor 302, a memory 304, a modification module 308, a communication module 309, a transceiver 310 including a modem subsystem 312 and radio frequency (RF) unit 314, and one or more antennas 316. These elements may be in direct or indirect communication with each other, for example via one or more buses.

The processor 302 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 304 includes a non-transitory computer-readable medium. The memory 304 may store, or have recorded thereon, instructions 306. The instructions 306 may include instructions that, when executed by the processor 302, cause the processor 302 to perform the operations described herein with reference to the BSs 105 (e.g., BS 105) in connection with aspects of the present disclosure, for example, aspects of FIGS. 1, 2, 5, 6, 7, 8, 9, 10, 11, 12, and/or 13. Instructions 306 may also be referred to as program code. The program code may be for causing a wireless communication device to perform these operations, for example by causing one or more processors (such as processor 302) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The modification module 308 and/or the communication module 309 may be implemented via hardware, software, or combinations thereof. For example, the modification module 308 and/or the communication module 309 may be implemented as a processor, circuit, and/or instructions 306 stored in the memory 304 and executed by the processor 302. In some instances, the modification module 308 and/or the communication module 309 can be integrated within the modem subsystem 312. For example, the modification module 308 and/or the communication module 309 can be implemented by a combination of software components (e.g., executed by a DSP or a general processor) and hardware components (e.g., logic gates and circuitry) within the modem subsystem 312.

The modification module 308 and/or the communication module 309 may be used for various aspects of the present disclosure, for example, aspects of FIGS. 1, 2, 5, 6, 7, 8, 9, 10, 11, 12, and/or 13. In some aspects, the modification module 308 may be configured to communicate, with a second wireless communication device (e.g., UE 115), a modification to a time parameter associated with at least one of an MIP of a frame period or an MCOT of the frame period. For instance, the modification module 308 may transmit to the UE 115, a modification to a time parameter associated with an MIP of a frame period and/or a modification to a time parameter associated with an MCOT of a frame period. In some aspects, the communication module 309 may be configured to communicate, with the second wireless communication device (e.g., UE 115), a communication signal during the frame period based on the modification to the time parameter. For instance, the modification module 308 may receive an UL communication signal during the frame period based on the modification to the time parameter and/or may transmit a DL communication signal during the frame period based on the modification to the time parameter.

As shown, the transceiver 310 may include the modem subsystem 312 and the RF unit 314. The transceiver 310 can be configured to communicate bi-directionally with other devices, such as the UE 115 and/or another core network element. The modem subsystem 312 may be configured to modulate and/or encode the data from the memory 304, the modification module 308 and/or the communication module 309 according to a modulation and coding scheme (MCS), e.g., a low-density parity check (LDPC) coding scheme, a turbo coding scheme, a convolutional coding scheme, a polar coding scheme, a digital beamforming scheme, etc. The RF unit 314 may be configured to process (e.g., perform analog to digital conversion or digital to analog conversion, etc.) modulated/encoded data (e.g., values for the frame period, MCOT, MIP, and/or MCOT-to-MIP ratio, modifications to the time parameter associated with the frame period, MCOT, MIP, and/or MCOT-to-MIP ratio, interference information (e.g., LBT result history, data reception performance between the first and second wireless communication devices, an MIP pattern, an MCOT pattern, etc.) from the modem subsystem 312 (on outbound transmissions) or of transmissions originating from another source such as a UE 115 or a BS 105. The RF unit 314 may be further configured to perform analog beamforming in conjunction with the digital beamforming. Although shown as integrated together in transceiver 310, the modem subsystem 312 and/or the RF unit 314 may be separate devices that are coupled together at the BS 105 to enable the BS 105 to communicate with other devices.

The RF unit 314 may provide the modulated and/or processed data, e.g. data packets (or, more generally, data messages that may contain one or more data packets and other information), to the antennas 316 for transmission to one or more other devices. This may include, for example, transmission of information to complete attachment to a network and communication with a camped UE 115 according to one or more aspects of the present disclosure. The antennas 316 may further receive data messages transmitted from other devices and provide the received data messages for processing and/or demodulation at the transceiver 310. The transceiver 310 may provide the demodulated and decoded data (e.g., values for the frame period, MCOT, MIP, and/or MCOT-to-MIP ratio, modifications to the time parameter associated with the frame period, MCOT, MIP, and/or MCOT-to-MIP ratio, interference information (e.g., LBT result history, data reception performance between the first and second wireless communication devices, an MIP pattern, an MCOT pattern, etc.) to the modification module 308 and/or the communication module 309 for processing. The antennas 316 may include multiple antennas of similar or different designs in order to sustain multiple transmission links. The RF unit 314 may configure the antennas 316.

In some aspects, the transceiver 310 may coordinate with the modification module 308 to transmit to the UE, a modification to a first time parameter associated with an MIP of a frame period and/or a modification to a second time parameter associated with an MCOT of the frame period. In some aspects, the transceiver 310 may coordinate with the communication module 308 to receive from the UE, a communication signal during the frame period based on the modification to the first time parameter and/or the second time parameter. In an aspect, the BS 300 can include multiple transceivers 310 implementing different RATs (e.g., NR and LTE). In an aspect, the BS 300 can include a single transceiver 310 implementing multiple RATs (e.g., NR and LTE). In an aspect, the transceiver 310 can include various components, where different combinations of components can implement different RATs.

Figure 4:
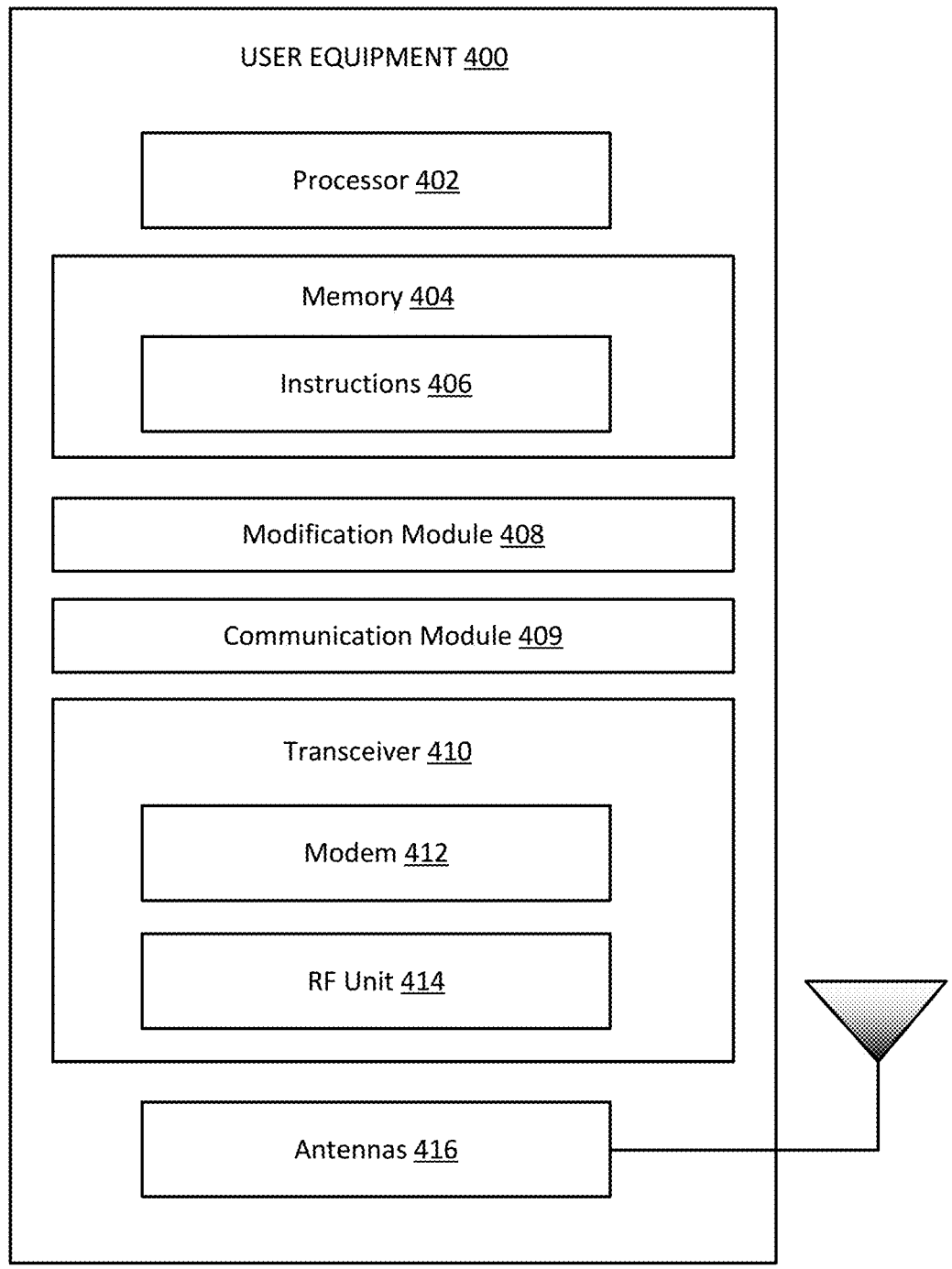
FIG. 4 is a block diagram of a user equipment (UE) according to one or more aspects of the present disclosure.

FIG. 4 is a block diagram of an example UE 400 according to one or more aspects of the present disclosure. The UE 400 may be a UE 115 as discussed above in FIG. 1. As shown, the UE 400 may include a processor 402, a memory 404, a modification module 408, a communication module 409, a transceiver 410 including a modem subsystem 412 and an RF unit 414, and one or more antennas 416. These elements may be in direct or indirect communication with each other, for example via one or more buses.

The processor 402 may have various features as a specific-type processor. For example, these may include a CPU, a DSP, an ASIC, a controller, a FPGA device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 404 includes a non-transitory computer-readable medium. The memory 404 may store, or have recorded thereon, instructions 406. The instructions 406 may include instructions that, when executed by the processor 402, cause the processor 402 to perform the operations described herein with reference to the UEs 115 in connection with aspects of the present disclosure, for example, aspects FIGS. 1, 2, 5, 6, 7, 8, 9, 10, 11, 12, and/or 13. Instructions 406 may also be referred to as program code. The program code may be for causing a wireless communication device to perform these operations, for example by causing one or more processors (such as processor 402) to control or command the wireless communication device to do so. The instructions 406 may also be referred to as code, which may be interpreted broadly to include any type of computer-readable statement(s) as discussed above with respect to FIG. 3.

The modification module 408 and/or the communication module 409 may be implemented via hardware, software, or combinations thereof. For example, the modification module 408 and/or the communication module 409 may be implemented as a processor, circuit, and/or instructions 406 stored in the memory 404 and executed by the processor 402. In some instances, the modification module 408 and/or the communication module 409 can be integrated within the modem subsystem 412. For example, the modification module 408 and/or the communication module 409 can be implemented by a combination of software components (e.g., executed by a DSP or a general processor) and hardware components (e.g., logic gates and circuitry) within the modem subsystem 412.

The modification module 408 and/or the communication module 409 may be used for various aspects of the present disclosure, for example, aspects of FIGS. 1, 2, 5, 6, 7, 8, 9, 10, 11, 12, and/or 13. In some aspects, the modification module 408 may be configured to communicate, with a second wireless communication device (e.g., BS 105), a modification to a time parameter associated with at least one of an MIP of a frame period or an MCOT of the frame period. For instance, the modification module 408 may receive from the BS 105, a modification to a time parameter associated with an MIP of a frame period and/or a modification to a time parameter associated with an MCOT of a frame period. In some aspects, the communication module 409 may be configured to communicate, with a second wireless communication device (e.g., BS 105), a communication signal during the frame period based on the modification to the time parameter. For instance, the modification module 408 may transmit an UL communication signal during the frame period based on the modification to the time parameter and/or may receive a DL communication signal during the frame period based on the modification to the time parameter.

As shown, the transceiver 410 may include the modem subsystem 412 and the RF unit 414. The transceiver 410 can be configured to communicate bi-directionally with other devices, such as the BSs 105 and/or another core network element. The modem subsystem 412 may be configured to modulate and/or encode the data from the memory 404, the modification module 408 and/or the communication module 409 according to an MCS, e.g., a LDPC coding scheme, a turbo coding scheme, a convolutional coding scheme, a polar coding scheme, a digital beamforming scheme, etc. The RF unit 414 may be configured to process (e.g., perform analog to digital conversion or digital to analog conversion, etc.) modulated/encoded data (e.g., values for the frame period, MCOT, MIP, and/or MCOT-to-MIP ratio, modifications to the time parameter associated with the frame period, MCOT, MIP, and/or MCOT-to-MIP ratio, interference information (e.g., LBT result history, data reception performance between the first and second wireless communication devices, an MIP pattern, an MCOT pattern, etc.) from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and/or the RF unit 414 may be separate devices that are coupled together at the UE 115 to enable the UE 115 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices. The antennas 416 may provide the received data messages for processing and/or demodulation at the transceiver 410. The transceiver 410 may provide the demodulated and decoded data (e.g., values for the frame period, MCOT, MIP, and/or MCOT-to-MIP ratio, modifications to the time parameter associated with the frame period, MCOT, MIP, and/or MCOT-to-MIP ratio, interference information (e.g., LBT result history, data reception performance between the first and second wireless communication devices, an MIP pattern, an MCOT pattern, etc.) to the modification module 408 and/or the communication module 409 for processing. The antennas 416 may include multiple antennas of similar or different designs in order to sustain multiple transmission links. The RF unit 414 may configure the antennas 416.

In some aspects, the transceiver 410 may coordinate with the modification module 408 to receive from the BS, a modification to a first time parameter associated with an MIP of a frame period and/or a modification to a second time parameter associated with an MCOT of the frame period. In some aspects, the transceiver 410 may coordinate with the communication module 409 to transmit to BS, a communication signal during the frame period based on the modification to the time parameter. In some aspects, the UE 400 can include multiple transceivers 410 implementing different RATs (e.g., NR and LTE). In an aspect, the UE 400 can include a single transceiver 410 implementing multiple RATs (e.g., NR and LTE). In an aspect, the transceiver 410 can include various components, where different combinations of components can implement different RATs.

FIG. 5 illustrates a table 500 providing a plurality of time-varying frame patterns according to one or more aspects of the present disclosure. Any of the time-varying frame patterns provided in the table 500 may be employed by BSs such as the BSs 105 and UEs such as the UEs 115 in a network such as the network 100 for communications. In particular, the BS 105 may communicate with the UE 115 using one or more of the time-varying frame patterns provided in the table 500. A time-varying frame pattern can be generated by varying at least one of a frame period, a MCOT duration, a MIP duration, or a MCOT-to-MIP ratio from one frame period to another frame period.

The table 500 includes a first column storing a time-varying frame pattern 502, in which the frame period is fixed, the MCOT is time-varying, the MIP is time-varying, and the MCOT-to-MIP ratio is time-varying for one or more frame periods. The table 500 includes a second column storing a time-varying frame pattern 504, in which the frame period is time-varying, the MCOT is fixed, the MIP is time-varying, and the MCOT-to-MIP ratio is time-varying for one or more frame periods. The table 500 includes a third column storing a time-varying frame pattern 506, in which the frame period is time-varying, the MCOT is time-varying, the MIP is fixed, and the MCOT-to-MIP ratio is time-varying for one or more frame periods. The table 500 includes a fourth column storing a time-varying frame pattern 508, in which the frame period is time-varying, the MCOT is time-varying, the MIP is time-varying, and the MCOT-to-MIP ratio is fixed for one or more frame periods. The table 500 includes a fifth column storing a time-varying frame pattern 510, in which the frame period is time-varying, the MCOT is time-varying, the MIP is time-varying, and the MCOT-to-MIP ratio is time-varying for one or more frame periods.

These different time-varying frame patterns may have tradeoffs between design freedom and signaling overhead for announcing the time-varying frame pattern. For example, the time-varying frame pattern 510 has a lot of freedom in terms of design because each of the frame period, the MCOT, the MIP, and the MCOT-to-MIP ratio may vary over time for one or more frame periods. The BS 105 transmits information for each of these time parameters to the UE 115, potentially resulting in higher signaling overhead compared to the other time-varying frame patterns provided in the table 500 because the other time-varying frame patterns have at least one fixed variable. For example, the time-varying frame pattern 502 has a FFP, the time-varying frame pattern 504 has a fixed MCOT, the time-varying frame pattern 506 has a fixed MIP, and the time-varying frame pattern 508 has a fixed MCOT-to-MIP ratio. Accordingly, it may be unnecessary for the BS 105 to transmit information (e.g., at every frame) for the fixed frame period in time-varying frame pattern 502, for the fixed MCOT in the time-varying frame pattern 504, for the fixed MIP in the time-varying frame pattern 506, or for the fixed MCOT-to-MIP ratio in the time-varying frame pattern 508, potentially resulting in less signaling overhead compared to the time-varying frame pattern 510.

In some examples, a BS 105 may determine a first frame pattern (e.g., the time-varying frame patterns 502, 504, 506, 508, and/or 510) for one or more frame periods and transmit information on the first frame pattern to the UE 115. For example, the first frame pattern may be the time-varying frame pattern 504 and apply to multiples of $N_1$ frames (e.g., $N_1$=eight frames), in which the fixed MCOT is X ms, the time-varying frame period is: $\{Z_1$ ms for the first frame period of the $N_1$ frames, $Z_2$ ms for the second frame period of the $N_1$ frames, $Z_3$ ms for the third frame period of the $N_1$ frames, ..., and $Z_n$ ms for the Nth frame period of the $N_1$ frames$\}$, the time-varying MIP is: $\{Y_1$ ms for the first frame period of the $N_1$ frames, $Y_2$ ms for the second frame period of the $N_1$ frames, $Y_3$ ms for the third frame period of the $N_1$ frames, ..., and $Y_n$ ms for the Nth frame period of the $N_1$ frames$\}$, where X, Y, and Z are numbers greater than 0. The first frame pattern information (e.g., the time-varying frame period, the fixed MCOT, the time-varying MIP, and/or the MCOT-to-MIP ratio) may be transmitted to the UE 115, and the first frame pattern may be repeated for every $N_1$ frames. The BS 105 may transmit the first frame pattern information via, for example, RRC, MAC-CE, or DCI. The UE 115 may receive the first frame pattern information and determine the first frame pattern for multiples of $N_1$ frames, where the first frame pattern is repeated for every $N_1$ frames.

The BS 105 may determine to modify the frame pattern applied to the frames and accordingly may determine a second frame pattern different from the first frame pattern. For example, the BS 105 may determine to modify a time parameter associated with the MIP such that the time-varying MIP in the second frame pattern is: $\{W_1$ ms for the first frame period of the $N_1$ frames, $W_2$ ms for the second frame period of the $N_1$ frames, $W_3$ ms for the third frame period of the $N_1$ frames, ..., and $W_n$ ms for the Nth frame period of the $N_1$ frames$\}$, where W is a number greater than 0. Additionally or alternatively, the BS 105 may determine to modify a time parameter associated with the fixed MCOT such that the MCOT in the second frame pattern is V ms, where V is a number greater than 0. The second frame pattern may be the time-varying frame pattern 504 and apply to multiples of $N_2$ frames (e.g., eight frames). The second frame pattern information (e.g., the time-varying frame period, the fixed MCOT, the time-varying MIP, and/or the MCOT-to-MIP ratio) may be transmitted to the UE 115, and the second frame pattern may be repeated for every $N_2$ frames. The BS 105 may transmit the second frame pattern information via, for example, RRC, MAC-CE, or DCI. The UE 115 may receive the second frame pattern information and determine the second frame pattern for multiples of $N_2$ frames, where the second frame pattern is repeated for every $N_2$ frames. The UE 115 may receive the first frame pattern information and determine the first frame pattern for multiples of $N_1$ frames, where the first frame pattern is repeated for every $N_1$ frames In some aspects, the BS 105 may transmit information for a first frame pattern to the UEs for multiples of N frames (e.g., the same frame pattern can be repeated for every N frames) and then modify one or more time parameters associated with the first frame pattern to determine a second frame pattern. For example, the frame pattern may be defined for N frames at a time. In some aspects, the BS 105 may transmit information for a first frame pattern to the UEs for every frame and then modify one or more time parameters associated with the first frame pattern to determine a second frame pattern for a next frame. For example, the frame pattern may be defined for one frame at a time. The BS 105 may transmit time-varying frame pattern information via, for example, RRC, MAC-CE, or DCI.

In the present disclosure, reference to a frame period, an MCOT, an MIP, and an MCOT-to-MIP ratio being fixed in a frame pattern may refer to the frame period, the MCOT, the MIP, and the MCOT-to-MIP ratio, respectively, being fixed for N frames in which the frame pattern is repeated, where N is a number greater than zero. For example, the BS 105 may determine and set a time parameter associated with the fixed frame period, the fixed MCOT, the fixed MIP, and/or the fixed MCOT-to-MIP ratio in a first frame pattern, where the respective time parameter is the same for the next N frames. The BS 105 may determine to modify any one of the fixed frame period, the fixed MCOT, the fixed MIP, and/or the fixed MCOT-to-MIP ratio in the first frame pattern and transmit a modification to a time parameter associated with the fixed frame period, the fixed MCOT, the fixed MIP, and/or the fixed MCOT-to-MIP ratio, where the respective modified time parameter applies to and is the same for the next N frames. Using an example provided above, the BS 105 may determine that a first frame pattern including the fixed MCOT for $N_1$ frames is: {X ms}. In this example, the BS 105 may transmit a time parameter specifying a fixed MCOT of X ms for $N_1$ frames, where the first frame pattern may be repeated for every $N_1$ frames. The BS 105 may determine to modify the MCOT in a second frame pattern and accordingly may transmit a modification to the time parameter specifying a fixed MCOT of W ms for $N_2$ frames, where the second frame pattern may be repeated for every $N_2$ frames. The BS 105 may use similar techniques to modify any one of the fixed frame period, the fixed MIP, and/or the fixed MCOT-to-MIP ratio in one or more frame patterns.

Additionally, reference to a frame period, an MCOT, an MIP, and an MCOT-to-MIP ratio being time-varying in a frame pattern may refer to the frame period, the MCOT, the MIP, and the MCOT-to-MIP ratio, respectively, varying with time for N frames in which the frame pattern is repeated, where N is a number greater than zero. For example, the BS 105 may determine and set a time parameter associated with a time-varying MIP, where the time parameter may be different for each frame of the N frames. The BS 105 may transmit a modification to the time parameter for each frame of the N frames. Using an example provided above, the BS 105 may determine that the time-varying MIP for the first frame pattern is: {$Y_1$ ms for the first frame period of the $N_1$ frames, $Y_2$ ms for the second frame period of the $N_1$ frames, $Y_3$ ms for the third frame period of the $N_1$ frames, . . . , and $Y_n$ ms for the Nth frame period of the $N_1$ frames}. In this example, the BS 105 may modify the time parameter associated with the MIP for each frame of the N frames, where the BS 105 may transmit a time parameter specifying a MIP of $Y_1$ ms for the first frame period of the $N_1$ frames, may transmit a modification to the time parameter specifying a MIP of $Y_2$ ms for the second frame period of the $N_1$ frames, may transmit a modification to the time parameter specifying a MIP of $Y_3$ ms for the third frame period of the $N_1$ frames, and may transmit a modification to the time parameter specifying a MIP of $Y_n$ ms for the Nth frame period of the $N_1$ frames. The BS 105 may use similar techniques to modify any one of the time-varying frame period, the time-varying MCOT, and/or the time-varying MCOT-to-MIP ratio in one or more frame patterns.

An operator may determine to use any of the time-varying frame patterns 502, 504, 506, 508, and/or 510 in FIG. 5. Additionally, operators sharing a channel may use the same or different time-varying frame patterns as each other. In some aspects, the network 100 and/or technical specification for operating in the network 100 imposes no time limitation on the time-varying frame period for one or more of the time-varying frame patterns 502, 504, 506, 508, and/or 510. In some aspects, the network 100 and/or technical specification for operating in the network 100 specifies that a sum of N time-varying frame periods is fixed for one or more of the time-varying frame patterns 504, 506, 508, and/or 510. Each of the time-varying frame patterns provided in the table 500 will be discussed in further detail below with respect to, for example, aspects of FIGS. 6-11.

Figure 6:
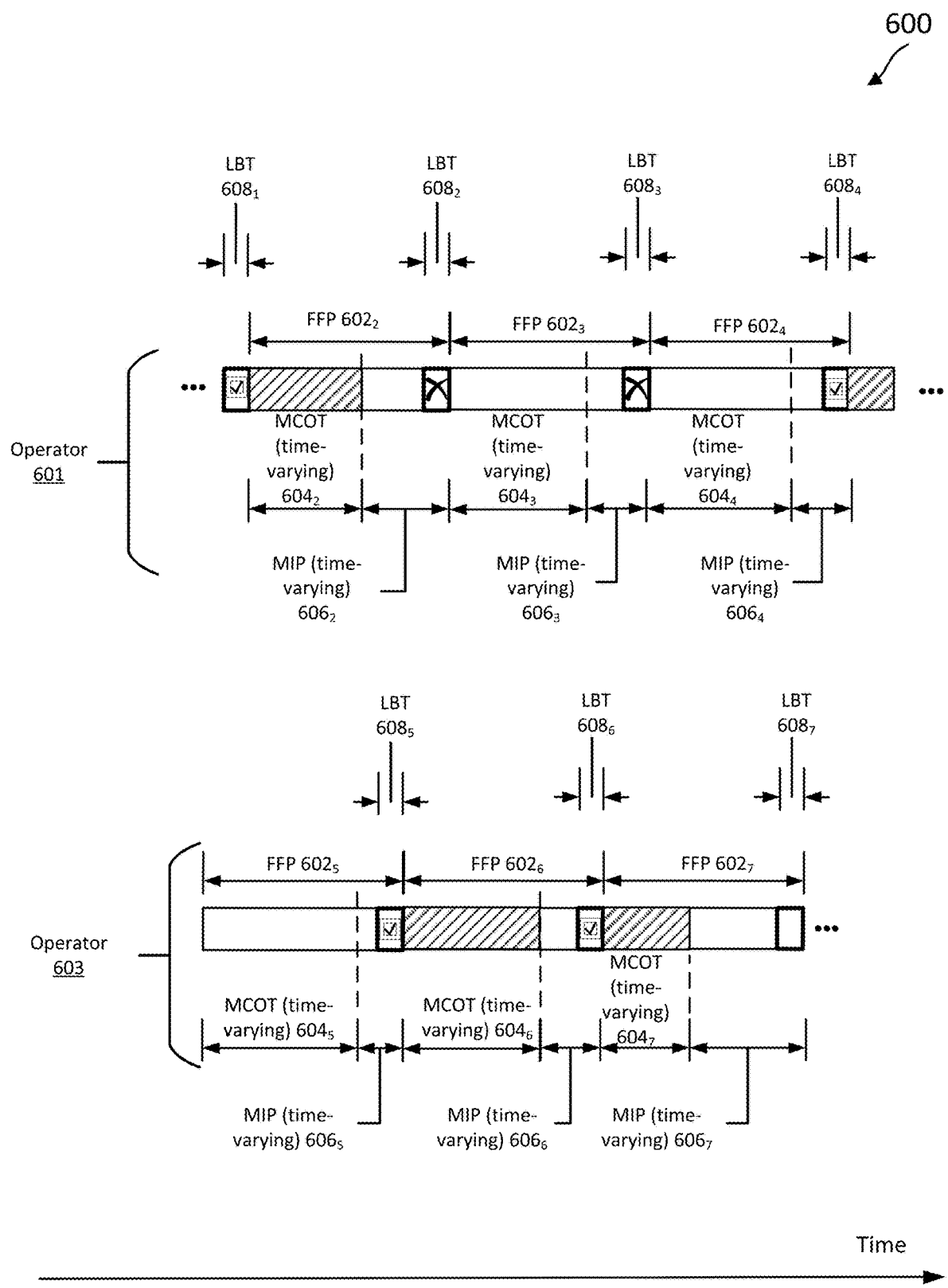
FIG. 6 illustrates a time-varying frame pattern according to one or more aspects of the present disclosure.

FIG. 6 illustrates a time-varying frame pattern 600 according to one or more aspects of the present disclosure. The time-varying frame pattern 600 may be employed by BSs such as the BSs 105 and UEs such as the UEs 115 in a network such as the network 100 for communications. In particular, the BS 105 may communicate with the UE 115 using the time-varying frame pattern 600. Additionally, the time-varying frame pattern 600 may correspond to the time-varying frame pattern 502 in FIG. 5. The x-axis represents time in some constant units.

In the example illustrated in FIG. 6, operators 601 and 603 may share a channel and perform LBT before transmitting on the channel. The operator 601 and/or the operator 603 may correspond to a BS (e.g., BSs 105). Although two operators are shown as sharing the channel, it should be understood that in other examples, more than two operators may share the channel and perform LBT on the channel. The time-varying frame pattern 600 may include FFPs, time-varying MCOTs of the FFP, time-varying MIPs of the FFP, and/or time-varying MCOT-to-MIP ratios of the FFP. In some aspects, the operators 601 and 603 are not asynchronized, and a variation of the duration of the MCOTs and/or the duration of the MIPs specified in a frame pattern by the operators may be large such that the operators do not perform LBT at about the same time and accordingly to not attempt to transmit communication signals (e.g., DL and/or UL communication signals) at about the same time. In some aspects, the frame periods are fixed, and an operator may transmit a modification to a first time parameter associated with an MIP of a FFP, transmit a modification to a second time parameter associated with an MCOT of the FFP, and/or transmit a modification to a third time parameter associated with an MCOT-to-MIP ratio of the FFP.

The time-varying frame pattern 600 may include an FFP 602 including a time-varying MCOT 604, and a time-varying MIP 606. The operator 601 may perform LBT 608 during the time-varying MIPs 606. The operator 601 may specify the durations of the MCOT $604_2$, the MCOT $604_3$, and/or the MCOT $604_4$ via a time parameter. Accordingly, the durations of the MCOT $604_2$, the MCOT $604_3$, and the MCOT $604_4$ may vary with time and may be the same as or different from each other. The UE 115 may determine a time parameter associated with the time-varying MCOT $604_2$ of the FFP $602_2$. The time parameter may indicate a duration of the MCOT $604_2$, which may vary with time. The UE 115 may determine the time parameter associated with the time-varying MCOT in various ways. In some aspects, the time parameter associated with the time-varying MCOT may be a default value that is defined in a technical specification. In some aspects, the operator 601 may transmit the time parameter associated with the time-varying MCOT to the UE 115. For example, the operator 601 may transmit a frame pattern of the FFP $602_2$ specifying the MCOT $604_2$ and/or an MIP $606_2$ to the UE 115. The operator 601 may transmit the frame pattern, for example, via RRC, MAC-CE, or DCI.

The operator 601 may determine to modify the time parameter associated with the MCOT of the FFP and accordingly may transmit a first modification to the time parameter associated with the time-varying MCOT. The first modification may, for example, indicate an increase or a decrease to the time parameter associated with the MCOT $604_2$ of the FFP $602_2$ immediately preceding the FFP $602_3$ and/or may indicate the time parameter (e.g., a duration) of the MCOT $604_3$ of the FFP $602_3$. A first FFP immediately precedes a second FFP if the first FFP precedes the second FFP and no FFPs are between the first and second FFPs. The operator 601 may transmit a time-varying frame pattern of the FFP $602_3$ specifying the time-varying MCOT $604_3$ to, for example, the UE 115. The operator 601 may transmit the time-varying frame pattern, for example, via RRC, MAC-CE, or DCI.

After transmitting the first modification to the time parameter associated with MCOT, the operator 601 may determine to modify the time parameter again and accordingly may transmit a second modification to the time parameter associated with the time-varying MCOT. The second modification may, for example, indicate an increase or a decrease to the time parameter associated with the MCOT $604_3$ of the FFP $602_3$ immediately preceding the FFP $606_4$ and/or may indicate the time parameter (e.g., a duration) of the MCOT $604_4$ of the FFP $602_4$. The operator 601 may transmit a time-varying frame pattern of the FFP $602_4$ specifying the time-varying MCOT $604_4$ to, for example, the UE 115.

The operator 601 may continue to modify the time parameter associated with the time-varying MCOTs in subsequent FFPs in the time-varying frame pattern 600. The operator 603 may perform similar actions to modify a time parameter associated with the time-varying MCOTs of the FFPs (e.g., MCOT $604_5$ of the FFP $602_5$, MCOT $604_6$ of the FFP $602_6$, and/or MCOT $604_7$ of the FFP $602_7$). The UE 115 may receive the time parameter associated with the time-varying MCOT of the FFPs and/or modifications to the time parameter and accordingly may determine the time-varying MCOTs of the FFPs in the time-varying frame pattern 600.

Additionally or alternatively, the operator 601 may specify the durations of the MIP $606_2$, the MIP $606_3$, and the MIP $606_4$ via a time parameter. Accordingly, the durations of the MIP $606_2$, the MIP $606_3$, and the MIP $606_4$ may vary with time and may be the same as or different from each other. The UE 115 may determine a time parameter associated with the time-varying MIP $606_2$ of the FFP $602_2$. The time parameter may indicate a duration of the MIP $606_2$, which may vary with time. The UE 115 may determine the time parameter associated with the time-varying MIP in various ways. In some aspects, the time parameter associated with the time-varying MIP may be a default value that is defined in the specification. In some aspects, the operator 601 may transmit the time parameter associated with the time-varying MIP to the UE 115.

The operator 601 may determine to modify the time parameter associated with the MIP of the FFP and accordingly may transmit a first modification to the time parameter associated with the time-varying MIP 606. The first modification may, for example, indicate an increase or a decrease to the time parameter associated with the MIP $606_2$ of the FFP $602_2$ immediately preceding the FFP $606_3$ and/or may indicate the time parameter (e.g., a duration) of the MIP $606_3$ of the FFP $602_3$. The operator 601 may transmit a time-varying frame pattern of the FFP $602_3$ specifying the time-varying MIP $606_3$ to, for example, the UE 115.

After transmitting the first modification to the time parameter associated with MIP, the operator 601 may determine to modify the time parameter again and accordingly may transmit a second modification to the time parameter associated with the time-varying MIP. The second modification may, for example, indicate an increase or a decrease to the time parameter associated with the MIP $606_3$ of the FFP $602_3$ immediately preceding the FFP $606_4$ and/or may indicate the time parameter (e.g., a duration) of the MIP $606_4$ of the FFP $602_4$. The operator 601 may transmit a time-varying frame pattern of the FFP $602_4$ specifying the time-varying MIP $606_4$ to, for example, the UE 115.

The operator 601 may continue to modify the time parameter associated with the time-varying MIPs in subsequent FFPs in the time-varying frame pattern 600. The operator 603 may perform similar actions to modify a time parameter associated with the time-varying MIPs of the FFPs (e.g., MIP $606_5$ of the FFP $602_5$, MIP $606_6$ of the FFP $602_6$, and/or MIP $606_7$ of the FFP $602_7$). The UE 115 may receive the time parameter associated with the MIPs of the FFPs and/or modifications to the time parameter and accordingly may determine the time-varying MIPs of the FFPs in the time-varying frame pattern 600.

The operator 601 may determine a time parameter in the form of the MCOT-to-MIP ratio of the frame period $602_2$, the frame period $602_3$, and/or the frame period $602_4$. Accordingly, the MCOT-to-MIP ratio of the frame period $602_2$, the frame period $602_3$, and/or the frame period $602_4$ may vary with time and may be the same as or different from each other. The UE 115 may determine a time parameter associated with the time-varying MCOT-to-MIP ratio of the frame period $602_2$. The time parameter may indicate the MCOT-to-MIP ratio, which may vary with time. The UE 115 may determine the time parameter associated with the MCOT-to-MIP ratio in various ways. In some aspects, the time parameter associated with the time-varying MCOT-to-MIP ratio may be a default value that is defined in the specification. In some aspects, the operator 601 may transmit the time parameter associated with the time-varying MCOT-to-MIP ratio to the UE 115. For example, the operator 601 may transmit a frame pattern specifying the MCOT-to-MIP ratio of the frame period $602_2$ to the UE 115.

The operator 601 may determine to modify the time parameter associated with the MCOT-to-MIP ratio and accordingly may transmit a first modification to the time parameter associated with the time-varying MCOT-to-MIP ratio. The first modification may, for example, indicate an increase or a decrease to the time parameter associated with the MCOT-to-MIP ratio of the frame period $602_2$ immediately preceding the frame period $602_3$ and/or may indicate the time parameter of the MCOT-to-MIP ratio of the frame period $602_3$. The operator 601 may transmit the MCOT-to-MIP ratio of the frame period $602_3$ to, for example, the UE 115.

After transmitting the first modification to the time parameter associated with MCOT-to-MIP ratio, the operator 601 may determine to modify the time parameter again and accordingly may transmit a second modification to the time parameter associated with the MCOT-to-MIP ratio. The second modification may, for example, indicate an increase or a decrease to the time parameter associated with the MCOT-to-MIP ratio of the frame period $602_3$ immediately preceding the frame period $602_4$ and/or may indicate the time parameter of the MCOT-to-MIP ratio of the frame period $602_4$. The operator 601 may transmit a time-varying frame pattern specifying the time-varying MCOT-to-MIP ratio of the frame period $602_4$ to, for example, the UE 115.

The operator 601 may continue to modify the time parameter associated with the MCOT-to-MIP ratio in subsequent frame periods in the time-varying frame pattern 600. The operator 603 may perform similar actions to modify a time parameter associated with the MCOT-to-MIP ratio of the frame periods (e.g., frame period $602_6$, frame period $602_7$, and/or frame period $602_8$). The UE 115 may receive the time parameter associated with the time-varying MCOT-to-MIP ratio and/or modifications to the time parameter and accordingly may determine the time-varying MCOT-to-MIP ratio of the frame periods in the time-varying frame patterns 600.

In the example illustrated in FIG. 6, before the operator 601 transmits a communication signal during the FFP $602_2$, the operator 601 may perform an LBT $608_1$ in an FFP immediately preceding the FFP $602_2$. As indicated by the checkmark corresponding to the LBT $608_1$, the LBT $608_1$ results in an LBT pass. Based on the successful LBT $608_1$ (LBT pass), the operator 601 may transmit a communication signal (e.g., an UL and/or DL communication signal) during the MCOT $604_2$ of the FFP $602_2$. The MCOT $604_2$ is followed by the MIP $606_2$ and ends before the operator 603 performs an LBT $608_5$ in the FFP $602_5$ immediately preceding the FFP $602_6$. Before the operator 603 transmits a communication signal during the FFP $602_6$, the operator 603 may perform an LBT $608_5$ in the FFP $602_5$. As indicated by the checkmark corresponding to the LBT $608_5$, the LBT $608_5$ results in an LBT pass. Based on the successful LBT $608_5$, the operator 603 may transmit a communication signal (e.g., an UL and/or DL communication signal) during the MCOT $604_6$ of the FFP $602_6$. Accordingly, the operator 603 is not starved and is able to access the channel to transmit a communication signal.

The likelihood of the operator 603's LBT $608_5$ resulting in an LBT pass may increase due to the utilization of time-varying MCOTs and/or MIPs of the FFPs (e.g., FFP $602_2$ (operator 601) and the FFP $602_5$ (operator 603)). For example, a duration of the MIP $606_2$ (operator 601) is greater than a duration of the MIP $606_5$ (operator 603), and the operator 601 does not occupy the channel during the MIP $606_2$. Accordingly, the operator 603 may have a higher likelihood of an LBT pass if the operator 603 performs LBT during the operator 601's MIP $606_2$. Accordingly, both the operators 601 and 603 may transmit a communication signal without interfering with each other at every FFP and may have access to the channel quite fairly, without starving the other from transmitting communication signals.

While the operator 603 transmits a communication signal (e.g., an UL and/or DL communication signal) during the MCOT $604_6$, the operator 601 may perform an LBT $608_2$ in the FFP $602_2$. The LBT $608_2$ results in an LBT fail, as indicated by the "X" mark corresponding to the LBT $608_2$. The operator 601 may wait until the next FFP $602_3$ and perform an LBT $608_3$ during the FFP $602_3$, which may result in an LBT fail as indicated by the "X" mark corresponding to the LBT $608_3$. The LBT $608_3$ results in the LBT fail based on the operator 603's data transmission during the time-varying MCOT $604_7$ of the FFP $602_7$. To transmit during the MCOT $604_7$, the operator 603 performed an LBT $608_6$ of the FFP $602_6$ that resulted in an LBT pass. Although the LBTs $608_2$ and $608_3$ performed by the operator 601 resulted in an LBT fail, the operator 601 performs a subsequent LBT $608_4$ during the FFP $602_4$ that results in an LBT pass and accordingly transmits a communication signal during the next FFP. Accordingly, the operator 601 is not starved and is able to access the channel to transmit a communication signal.

The likelihood of the operator 601's LBT $608_4$ resulting in the LBT pass may increase due to the time-varying nature of the MCOTs and/or MIPs of the FFPs (e.g., FFP $602_4$ (operator 601) and the FFP $602_7$ (operator 603)). For example, a duration of the MCOT $604_7$ of the FFP $602_7$ is shorter than a duration of the MCOT $604_4$ of the FFP $602_4$, and the operator 603 ceases to transmit after an end of the MCOT $604_7$. A time-varying MIP $606_7$ may start at the end of the MCOT $604_7$ and accordingly, the operator 601 may have a higher likelihood of an LBT pass if the operator 601 performs LBT after the shorter time-varying MCOT $604_7$ and longer time-varying MIP $606_7$. A duration of the MCOT $604_7$ (operator 603) is less than a duration of the MCOT $604_4$ (operator 601), a duration of the MIP $606_7$ (operator 603) is greater than a duration of the MIP $606_4$ (operator 601), and the operator 603 does not occupy the channel during the MIP $606_7$. Accordingly, the operator 601 may have a higher likelihood of an LBT pass if the operator 601 performs LBT during the operator 603's MIP $606_7$. Accordingly, both the operators 601 and 603 may transmit a communication signal without interfering with each other at every FFP and may have access to the channel quite fairly, without starving the other from transmitting communication signals.

Limitations may be imposed on the time-varying MCOTs of the FFPs and/or the time-varying MIPs of the FFPs of the time-varying frame pattern 600. In some aspects, an operator (e.g., the operator 601 and/or the operator 603) may determine the MIP per frame period, where the MIP per frame period is greater than a time threshold. The time threshold may be, for example, 100 microseconds (μs) or about 100 μs. In some aspects, the operator may determine the MIP per frame period, where an average of the MIP per K frame periods is greater than a percentage threshold of an average of the MCOT per K frame periods, and K is a number greater than one. The percentage threshold may be, for example, five percent or about five percent.

In some aspects, the operator may transmit a modification to a time parameter associated with a ratio of the MCOT to the MIP. The operator may communicate a communication signal during the frame period based on the modification to the time parameter associated with the ratio and/or the modification to the time parameter associated with at least one of an MIP of a frame period or an MCOT of the frame period.

Figure 7:
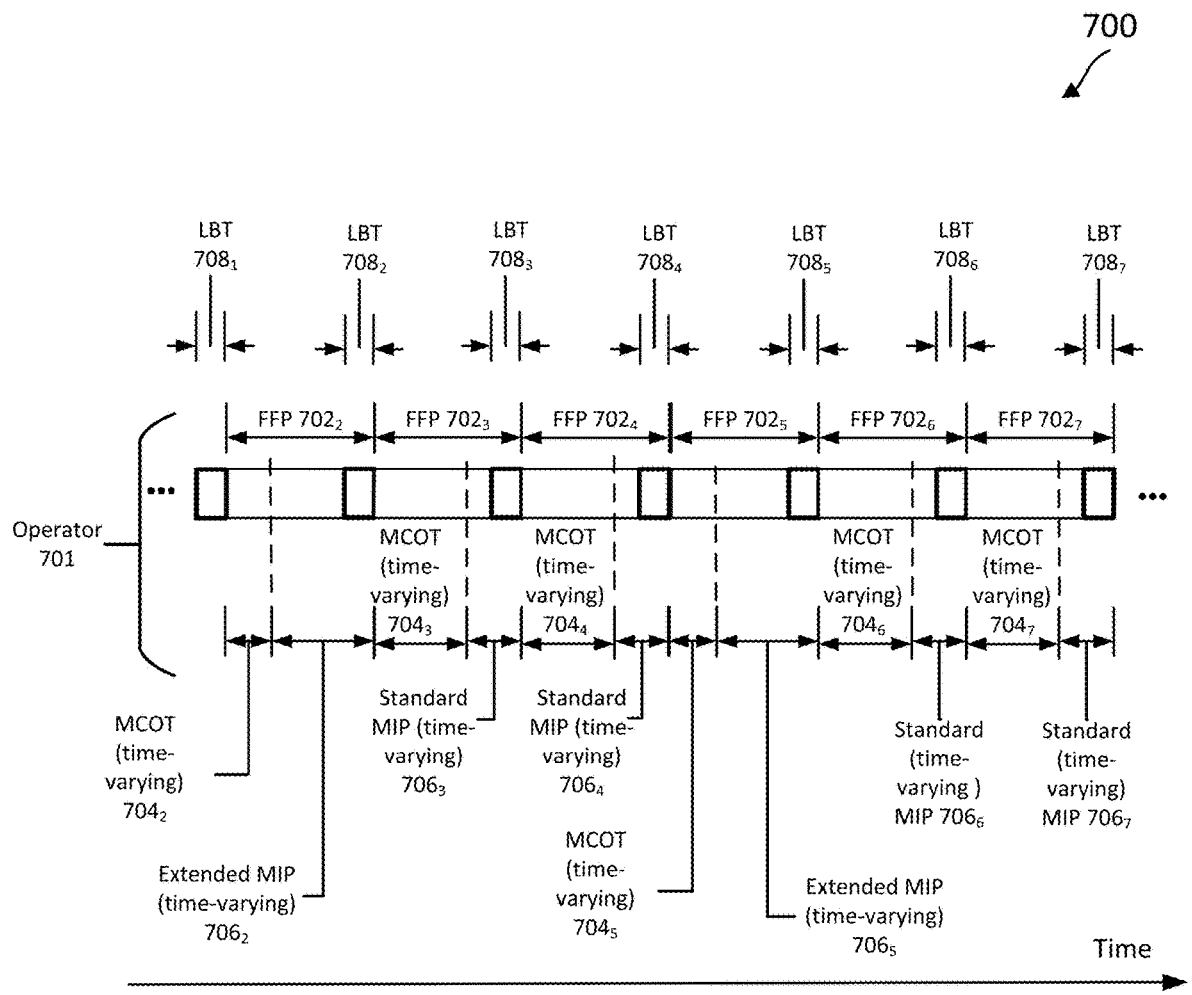
FIG. 7 illustrates a time-varying frame pattern including a minimum idle period (MIP) pattern according to one or more aspects of the present disclosure.

FIG. 7 illustrates a time-varying frame pattern 700 including a MIP pattern according to one or more aspects of the present disclosure. The time-varying frame pattern 700 may be employed by BSs such as the BSs 105 and UEs such as the UEs 115 in a network such as the network 100 for communications. In particular, the BS 105 may communicate with the UE 115 using the time-varying frame pattern 700. Additionally, the time-varying frame pattern 700 may correspond to the time-varying frame pattern 502 in FIG. 5. The x-axis represents time in some constant units.

The time-varying frame pattern 700 may include a FFP 702 including a time-varying MCOT 704 and a time-varying MIP 706. In some aspects, the time-varying frame pattern 700 may include an MIP pattern including a first MIP of a first set of frame periods and a second MIP of a second set of frame periods. The first MIP of the first set of frame periods may have a longer duration than the second MIP of the second set of frame periods. The first MIP may be referred to as an extended MIP and may correspond to extended MIPs $706_2$ and $706_5$. The second MIP may be referred to as a standard MIP and may correspond to standard MIPs $706_3$ and $706_4$ and standard MIPs $706_6$ and $706_7$. Additionally, an operator 701 may transmit communication signals during the first and second sets of frame periods based on the MIP pattern. The UE 115 may receive the communication signals during the first and second sets of frame periods based on the MIP pattern. Each of the first set and second set of frame periods may include one or more frame periods. In some instances, the first set of frame periods includes one frame period, and the second set of frame periods includes two or more frame periods. The second set of frame periods may immediately succeed the first set of frame periods.

In some aspects, the operator 701 may transmit a modification to a time parameter by transmitting the modification to the time parameter associated with at least one of the first MIP or the first set of frame periods. For example, the operator 701 may modify the time parameter of the first MIP and/or the first set of frame periods. In another example, the operator 701 may modify the time parameter of the second MIP and/or the second set of frame periods.

The operator 701 may correspond to a BS (e.g., BSs 105) and may determine the MIP pattern. The operator 701 may transmit the MIP pattern to a UE 115 and may perform an LBT 708 during the time-varying MIP 706. The MIP pattern specified in the time-varying frame pattern 700 may be an extended MIP for one FFP, a standard MIP for the next two FFPs, and the MIP pattern may repeat for subsequent FFPs until the operator 701 transmits a modification to the time parameter associated with the time-varying MIP.

These MIP patterns are not intended to be limiting, and other examples of MIP patterns are within the scope of the disclosure. For example, although two different MIP durations (e.g., extended and standard MIPs) are shown as being included in an MIP pattern, this is not intended to be limiting, and in other examples, an MIP pattern may include more than two MIP durations. For example, a third duration of an MIP may be shorter than the extended and standard MIPs and may be referred to as a shortened MIP. Accordingly, an MIP pattern may include an extended MIP for a first set of FFPs, a standard MIP for a second set of FFPs, and a shortened MIP for a third set of FFPs, where each of the first, second, and third sets of FFPs may include one or more FFPs.

The discussion of MIP patterns may extend to MCOT patterns. In some aspects, a time-varying frame pattern may include an MCOT pattern including a first MCOT of a first set of frame periods and a second MCOT of a second set of frame periods. The first MCOT of the first set of frame periods may have a longer duration than the second MCOT of the second set of frame periods. The first MCOT may be referred to as an extended MCOT, and the second MCOT may be referred to as a standard MIP. Additionally, the operator 701 may transmit communication signals during the first and second sets of frame periods based on the MCOT pattern. The UE 115 may receive the communication signals during the first and second sets of frame periods based on the MCOT pattern. Each of the first set and second set of frame periods may include one or more frame periods. In some instances, the first set of frame periods includes one frame period, and the second set of frame periods includes two or more frame periods. The second set of frame periods may immediately succeed the first set of frame periods.

In some aspects, the operator 701 may transmit a modification to a time parameter by transmitting the modification to the time parameter associated with at least one of the first MCOT or the first set of frame periods. For example, the operator 701 may modify the time parameter of the first MCOT and/or the first set of frame periods. In another example, the operator 701 may modify the time parameter of the second MCOT and/or the second set of frame periods.

The operator 701 may determine the MCOT pattern and transmit the MCOT pattern to a UE 115. The MCOT pattern specified in the time-varying frame pattern may be an extended MCOT for one FFP, a standard MCOT for the next four FFPs, and the MCOT pattern may repeat for subsequent FFPs until the operator 701 transmits a modification to the time parameter associated with the time-varying MCOT.

These MCOT patterns are not intended to be limiting, and other examples of MCOT patterns are within the scope of the disclosure. For example, although two different MCOT durations (e.g., extended and standard MCOT) are discussed as being included in an MCOT pattern, this is not intended to be limiting, and in other examples, an MCOT pattern may include more than two MCOT durations. For example, a third duration of an MCOT may be shorter than the extended and standard MCOTs and may be referred to as a shortened MCOT. Accordingly, an MCOT pattern may include an extended MCOT for a first set of FFPs, a standard MCOT for a second set of FFPs, and a shortened MCOTs for a third set of FFPs, where each of the first, second, and third sets of FFPs may include one or more FFPs.

Figure 8:
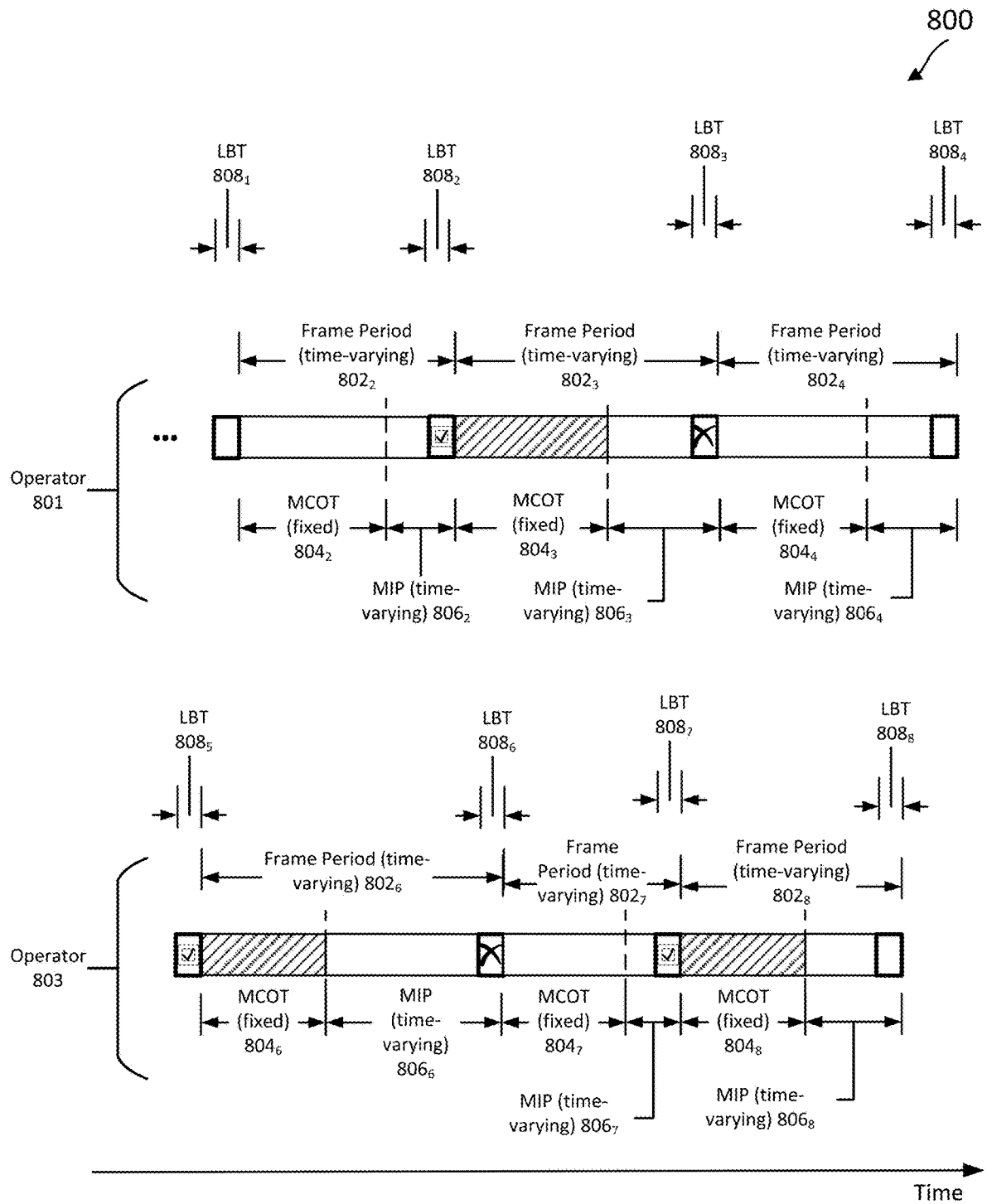
FIG. 8 illustrates a time-varying frame pattern according to one or more aspects of the present disclosure.

FIG. 8 illustrates a time-varying frame pattern 800 according to one or more aspects of the present disclosure. The time-varying frame pattern 800 may be employed by BSs such as the BSs 105 and UEs such as the UEs 115 in a network such as the network 100 for communications. In particular, the BS 105 may communicate with the UE 115 using the time-varying frame pattern 800. Additionally, the time-varying frame pattern 800 may correspond to the time-varying frame pattern 504 in FIG. 5. The x-axis represents time in some constant units.

In the example illustrated in FIG. 8, operators 801 and 803 may share a channel and perform LBT before transmitting on the channel. The operator 801 and/or the operator 803 may correspond to a BS (e.g., BSs 105). Although two operators are shown as sharing the channel, it should be understood that in other examples, more than two operators may share the channel and perform LBT on the channel. The time-varying frame pattern 800 may include time-varying frame periods, fixed MCOTs of the frame period, time-varying MIPs of the frame period, and/or time-varying MCOT-to-MIP ratios of the frame period. In some aspects, the operators 801 and 803 are not asynchronized, and a variation of the duration of the frame periods and/or the duration of the MIPs may be large such that the operators do not perform LBT at about the same time and accordingly to not attempt to transmit communication signals (e.g., DL and/or UL communication signals) at about the same time. In some aspects, the MCOTs of the frame periods are fixed, and an operator may transmit a modification to a first time parameter associated with an MIP of a frame period, transmit a modification to a second time parameter associated with the frame period, and/or transmit a modification to a third time parameter associated with an MCOT-to-MIP ratio of the frame period.

The time-varying frame pattern 800 may include a time-varying frame period 802 including a fixed MCOT 804 and a time-varying MIP 806. The operator 801 may perform LBT 808 during the time-varying MIPs 806. The operator 801 may specify the durations of the frame period $802_2$, the frame period $802_3$, and/or the frame period $802_4$ via a time parameter. Accordingly, the durations of the frame period $802_2$, the frame period $802_3$, and/or the frame period $802_4$ may vary with time and may be the same as or different from each other. The UE 115 may determine a time parameter associated with the time-varying frame period $802_2$. The time parameter may indicate a duration of the frame period $802_2$, which may vary with time. The UE 115 may determine the time parameter associated with the time-varying frame period in various ways. In some aspects, the time parameter associated with the time-varying frame period may be a default value that is defined in the specification. In some aspects, the operator 801 may transmit the time parameter associated with the time-varying frame period to the UE 115. For example, the operator 801 may transmit a frame pattern specifying the frame period $802_2$ and/or the MIP $806_2$ to the UE 115.

The operator 801 may determine to modify the time parameter associated with the frame period and accordingly may transmit a first modification to the time parameter associated with the time-varying frame period. The first modification may, for example, indicate an increase or a decrease to the time parameter associated with the frame period $802_2$ immediately preceding the frame period $802_3$ and/or may indicate the time parameter (e.g., a duration) of the frame period $802_3$. The operator 801 may transmit a time-varying frame pattern specifying the time-varying frame period $802_3$ to, for example, the UE 115.

After transmitting the first modification to the time parameter associated with frame period, the operator 801 may determine to modify the time parameter again and accordingly may transmit a second modification to the time parameter associated with the time-varying frame period. The second modification may, for example, indicate an increase or a decrease to the time parameter associated with the frame period $802_3$ immediately preceding the frame period $802_4$ and/or may indicate the time parameter (e.g., a duration) of the frame period $802_4$. The operator 801 may transmit a time-varying frame pattern specifying the time-varying frame period $802_4$ to, for example, the UE 115.

The operator 801 may continue to modify the time parameter associated with the time-varying frame periods in subsequent frame periods in the time-varying frame pattern 800. The operator 803 may perform similar actions to modify a time parameter associated with the time-varying frame periods (e.g., frame period $802_6$, frame period $802_7$, and/or frame period $802_8$). The UE 115 may receive the time parameter associated with the time-varying frame period and/or modifications to the time parameter and accordingly may determine the time-varying frame periods in the time-varying frame patterns 800.

Additionally or alternatively, the operator 801 may specify the durations of the MIP $806_2$, the MIP $806_3$, and the MIP $806_4$ via a time parameter. Accordingly, the durations of the MIP $806_2$, the MIP $806_3$, and the MIP $806_4$ may vary with time and may be the same as or different from each other. The UE 115 may determine a time parameter associated with the time-varying MIP $806_2$ of the frame period $802_2$. The time parameter may indicate a duration of the MIP $806_2$, which may vary with time. The UE 115 may determine the time parameter associated with the time-varying MIP in various ways, as discussed in relation to aspects of FIG. 6. Additionally or alternatively, the operators 801 and 803 may use similar techniques as discussed in above in relation to aspects of FIG. 6 to determine to modify the time parameter associated with the time-varying MIP 806 and/or to transmit modifications to the time parameter associated with the time-varying MIP 806.

In the example illustrated in FIG. 8, the operator 803 may perform an LBT $808_5$ in a frame period $802_5$ immediately preceding the frame period $802_6$. As indicated by the checkmark corresponding to the LBT $808_5$, the LBT $808_5$ results in an LBT pass. Based on the successful LBT $808_5$ (LBT pass), the operator 801 may transmit a communication signal (e.g., an UL and/or DL communication signal) during the fixed MCOT $804_6$ of the frame period $802_6$.

Additionally, before the operator 801 transmits a communication signal during the frame period $802_3$, the operator 801 may perform an LBT $808_2$ in a frame period $802_2$ immediately preceding the frame period $803_2$. As indicated by the checkmark corresponding to the LBT $808_2$, the LBT $808_2$ results in an LBT pass. Based on the successful LBT $808_2$ (LBT pass), the operator 801 may transmit a communication signal (e.g., an UL and/or DL communication signal) during the fixed MCOT $804_3$ of the frame period $802_3$. The likelihood of the operator 801's LBT $808_2$ resulting in an LBT pass may increase due to the time-varying nature of the frame periods and/or MIPs. For example, a duration of the MIP $806_6$ (operator 803) is greater than a duration of the MIP $806_2$ (operator 801), and the operator 803 does not occupy the channel during the MIP $806_6$. Accordingly, the operator 801 may have a higher likelihood of an LBT pass if the operator 801 performs LBT during the operator 803's MIP $806_6$. Accordingly, the operator 801 may transmit a communication signal without interfering with the operator 803 at every frame period. Additionally, the operators 801 and 803 may have access to the channel quite fairly, without starving the other from transmitting communication signals.

While the operator 801 transmits the communication signal (e.g., an UL and/or DL communication signal) during the MCOT $804_3$, the operator 803 may perform an LBT $808_6$ in the frame period $802_6$. The LBT $808_6$ results in an LBT fail, as indicated by the "X" mark corresponding to the LBT $808_6$. The operator 803 may wait until the next frame period $802_7$ and perform an LBT $808_7$ during the frame period $802_7$. As indicated by the checkmark corresponding to the LBT $808_7$, the LBT $808_7$ results in an LBT pass. Based on the successful LBT $808_7$ (LBT pass), the operator 801 may transmit a communication signal (e.g., an UL and/or DL communication signal) during the fixed MCOT $804_8$ of the frame period $802_8$. The likelihood of the operator 803's LBT $808_7$ resulting in the LBT pass may increase due to the time-varying nature of the frame periods and/or MIPs of the frame periods. For example, a duration of the MIP $806_3$ (operator 801) is greater than a duration of the MIP $806_7$ (operator 803), and the operator 801 does not occupy the channel during the MIP $806_3$. Accordingly, the operator 803 may have a higher likelihood of an LBT pass if the operator 803 performs LBT during the operator 801's MIP $806_3$. Accordingly, both the operators 801 and 803 may transmit a communication signal without interfering with each other at every FFP and may have access to the channel quite fairly, without starving the other from transmitting communication signals.

Additionally or alternatively, the operator 801 may specify the durations of the MIP $806_2$, the MIP $806_3$, and the MIP $806_4$ via a time parameter. Accordingly, the durations of the MIP $806_2$, the MIP $806_3$, and the MIP $806_4$ may vary with time and may be the same as or different from each other. The UE 115 may determine a time parameter associated with the time-varying MIP $806_2$ of the frame period $802_2$. The time parameter may indicate a duration of the MIP $806_2$, which may vary with time. The UE 115 may determine the time parameter associated with the time-varying MIP in various ways, as discussed in relation to aspects of FIG. 6. Additionally or alternatively, the operators 801 and 803 may use similar techniques as discussed in above in relation to aspects of FIG. 6 to determine to modify the time parameter associated with the time-varying MIP 806 and/or to transmit modifications to the time parameter associated with the time-varying MIP 806.

Additionally or alternatively, the operator 801 may specify the MCOT-to-MIP ratios of the frame periods $802_2$, $802_3$, and/or $802_4$ via a time parameter. Accordingly, the MCOT-to-MIP ratios of the frame periods $802_2$, $802_3$, and $802_4$ may vary with time and may be the same as or different from each other. The UE 115 may determine a time parameter associated with the time-varying MCOT-to-MIP ratio of the frame period $802_2$. The time parameter may indicate the MCOT-to-MIP ratio, which may vary with time. The UE 115 may determine the time parameter associated with the time-varying MCOT-to-MIP ratio in various ways, as discussed in relation to aspects of FIG. 6. Additionally or alternatively, the operators 801 and 803 may use similar techniques as discussed in above in relation to aspects of FIG. 6 to determine to modify the time parameter associated with the time-varying MCOT-to-MIP ratio and/or to transmit modifications to the time parameter associated with the time-varying MCOT-to-MIP ratio.

Limitations may be imposed on the fixed MCOTs and/or the time-varying MIPs of the frame periods of the time-varying frame pattern 800. In some aspects, an operator (e.g., the operator 801 and/or the operator 803) may determine the MIP per frame period, where the MIP per frame period is greater than a time threshold. The time threshold may be, for example, 100 μs or about 100 μs. In some aspects, the operator may determine the MIP per frame period, where an average of the MIP per K frame periods is greater than a percentage threshold of the fixed MCOT, and K is a number greater than one. The percentage threshold may be, for example, five percent or about five percent.

In some aspects, the operator may transmit a modification to a time parameter associated with a ratio of the MCOT to the MIP. The operator may communicate a communication signal during the frame period based on the modification to the time parameter associated with the ratio and/or the modification to the time parameter associated with at least one of an MIP of a frame period or the frame period. In some aspects, the operator 801 may transmit to the UE 115, a modification to a time parameter associated with the frame period, where a sum of a first number of time-varying frame periods is fixed.

Figure 9:
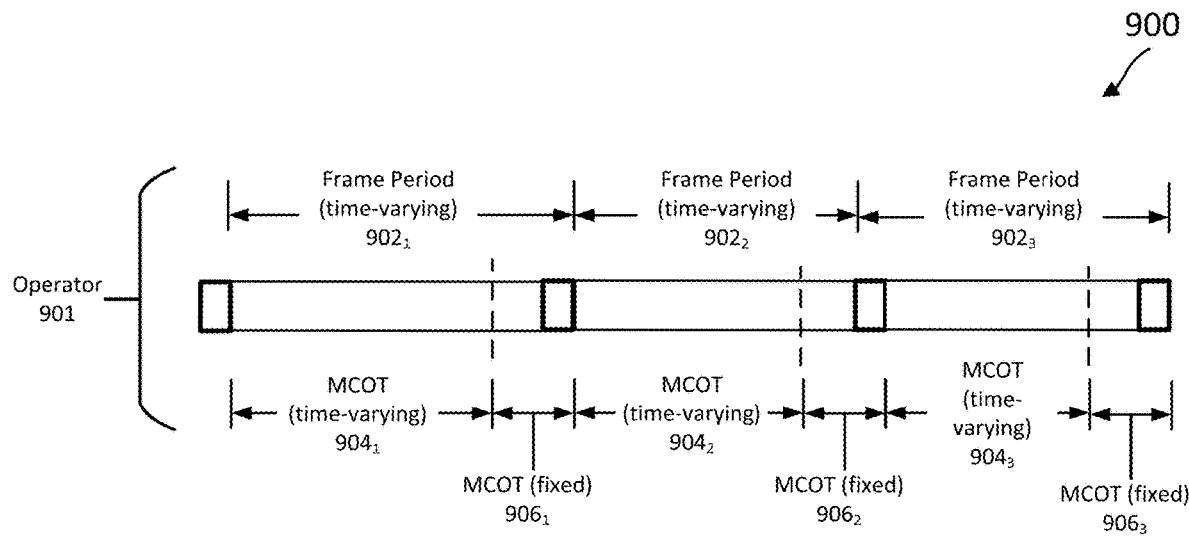
FIG. 9 illustrates a time-varying frame pattern according to one or more aspects of the present disclosure.

FIG. 9 illustrates a time-varying frame pattern 900 according to one or more aspects of the present disclosure. The time-varying frame pattern 900 may be employed by BSs such as the BSs 105 and UEs such as the UEs 115 in a network such as the network 100 for communications. In particular, the BS 105 may communicate with the UE 115 using the time-varying frame pattern 900. Additionally, the time-varying frame pattern 900 may correspond to the time-varying frame pattern 506 in FIG. 5. The x-axis represents time in some constant units.

In the example illustrated in FIG. 9, an operator 901 may share a channel with one or more other operators and may perform LBT before transmitting on the channel. The operators may correspond to a BS (e.g., BSs 105). The time-varying frame pattern 900 may include time-varying frame periods, time-varying MCOTs of a frame period, fixed MIPs of the frame period, and/or time-varying MCOT-to-MIP ratios of the frame period. In some aspects, the operators are not asynchronized, and a variation of the duration of the frame periods and/or the duration of the MCOTs may be large such that the operators do not perform LBT at about the same time and accordingly to not attempt to transmit communication signals (e.g., DL and/or UL communication signals) at about the same time. In some aspects, the MIPs of the frame periods are fixed, and an operator may transmit a modification to a first time parameter associated with a frame period, transmit a modification to a second time parameter associated with an MCOT of the time-varying frame period, and/or transmit a modification to a third time parameter associated with an MCOT-to-MIP ratio of the time-varying frame period.

The time-varying frame pattern 900 may include a time-varying frame period 902, which may include a time-varying MCOT 904 and a fixed MIP 906. The operator 901 may perform LBT during the time-varying MIPs 906. The operator 901 may specify the durations of the frame period $902_1$, the frame period $902_2$, and/or the frame period $902_3$ via a time parameter. Accordingly, the durations of the frame period $902_1$, the frame period $902_2$, and/or the frame period $902_3$ may vary with time and may be the same as or different from each other. The UE 115 may determine a time parameter associated with the time-varying frame period $902_1$. The time parameter may indicate a duration of the frame period $902_1$, which may vary with time. The UE 115 may determine the time parameter associated with the time-varying frame period in various ways, as discussed in relation to aspects of FIG. 8.

Additionally or alternatively, the operators 901 may use similar techniques as discussed in above in relation to aspects of FIG. 8 to determine to modify the time parameter associated with the time-varying frame periods 902 and/or to transmit modifications to the time parameter associated with the time-varying frame periods 902.

Additionally or alternatively, the operator 901 may specify the durations of the MCOT $904_1$, the MCOT $904_2$, and/or the MCOT $904_3$ via a time parameter. Accordingly, the durations of the MCOT $904_1$, the MCOT $904_2$, and/or the MCOT $904_3$ may vary with time and may be the same as or different from each other. The UE 115 may determine a time parameter associated with the time-varying MCOT $904_1$ of the frame period $902_1$. The time parameter may indicate a duration of the MCOT $904_1$, which may vary with time. The UE 115 may determine the time parameter associated with the time-varying MCOT in various ways, as discussed in relation to aspects of FIG. 6. The operators 901 may use similar techniques as discussed in above in relation to aspects of FIG. 6 to determine to modify the time parameter associated with the time-varying MCOTs 904 and/or to transmit modifications to the time parameter associated with the time-varying MCOTs 904. The likelihood of the operator 901's LBT resulting in the LBT pass may increase due to the time-varying nature of the frame periods and/or MCOTs of the frame periods.

Additionally or alternatively, the operator 901 may specify the MCOT-to-MIP ratios of the frame periods $902_1$, $902_2$, and/or $902_3$ via a time parameter. Accordingly, the MCOT-to-MIP ratios of the frame periods $902_1$, $902_2$, and/or $902_3$ may vary with time and may be the same as or different from each other. The UE 115 may determine a time parameter associated with the time-varying MCOT-to-MIP ratio of the frame period $902_1$. The time parameter may indicate the MCOT-to-MIP ratio, which may vary with time. The UE 115 may determine the time parameter associated with the time-varying MCOT-to-MIP ratio in various ways, as discussed in relation to aspects of FIG. 6. Additionally or alternatively, the operators 901 may use similar techniques as discussed in above in relation to aspects of FIG. 6 to determine to modify the time parameter associated with the time-varying MCOT-to-MIP ratio and/or to transmit modifications to the time parameter associated with the time-varying MCOT-to-MIP ratio.

Limitations may be imposed on the time-varying MCOTs and/or the fixed MIPs of the frame periods of the time-varying frame pattern 900. In some aspects, the operator 901 may determine the fixed MIP per frame period, where the MIP per frame period is greater than a time threshold. The time threshold may be, for example, 100 microseconds (μs) or about 100 μs. In some aspects, the operator 901 may determine the MCOT per frame period, where the fixed MIP is greater than a percentage threshold an average of the MCOT per K frame periods, and K is a number greater than one. The percentage threshold may be, for example, five percent or about five percent.

In some aspects, the operator may transmit a modification to a time parameter associated with a ratio of the MCOT to the MIP. The operator may communicate a communication signal during the frame period based on the modification to the time parameter associated with the ratio and/or the modification to the time parameter associated with at least one of an MCOT of a frame period or the frame period. In some aspects, the operator 901 may transmit to the UE 115, a modification to a time parameter associated with the frame period, where a sum of a first number of time-varying frame periods is fixed.

Figure 10:
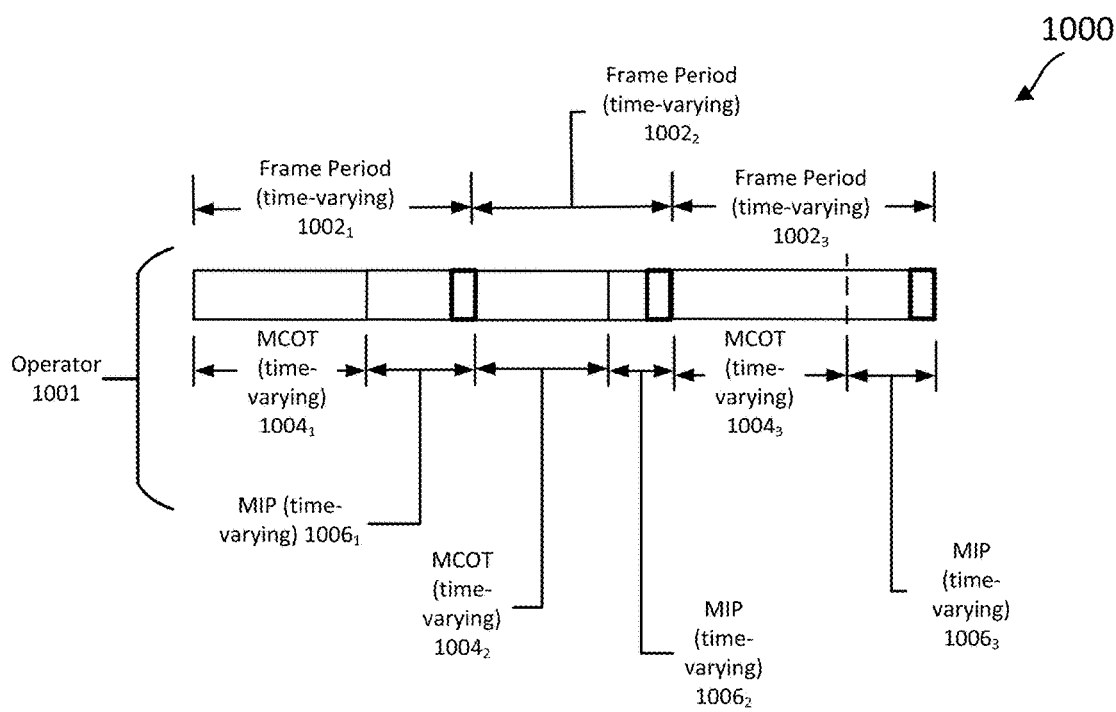
FIG. 10 illustrates a time-varying frame pattern according to one or more aspects of the present disclosure.

FIG. 10 illustrates a time-varying frame pattern 1000 according to one or more aspects of the present disclosure. The time-varying frame pattern 1000 may be employed by BSs such as the BSs 105 and UEs such as the UEs 115 in a network such as the network 100 for communications. In particular, the BS 105 may communicate with the UE 115 using the time-varying frame pattern 1000. Additionally, the time-varying frame pattern 1000 may correspond to the time-varying frame pattern 508 in FIG. 5. The x-axis represents time in some constant units.

In the example illustrated in FIG. 10, an operator 1001 may share a channel with one or more other operators and may perform LBT before transmitting on the channel. The operators may correspond to a BS (e.g., BSs 105). The time-varying frame pattern 1000 may include time-varying frame periods, time-varying MCOTs of a frame period, time-varying MIPs of the frame period, and/or fixed MCOT-to-MIP ratios of the frame period. In some aspects, the operators are not asynchronized, and a variation of the duration of the frame periods, the duration of the MCOTs, and/or the duration of the MIPs may be large such that the operators do not perform LBT at about the same time and accordingly to not attempt to transmit communication signals (e.g., DL and/or UL communication signals) at about the same time. In some aspects, the MCOT-to-MIP ratio of the frame periods is fixed, and an operator may transmit a modification to a first time parameter associated with a frame period, transmit a modification to a second time parameter associated with an MCOT of the time-varying frame period, and/or transmit a modification to a third time parameter associated with an MIP of the time-varying frame period.

The time-varying frame pattern 1000 may include a time-varying frame period 1002, which may include a time-varying MCOT 1004 and a time-varying MIP 1006. The operator 1001 may perform LBT during the time-varying MIPs 1006. The operator 1001 may specify the durations of the frame period $1002_1$, the frame period $1002_2$, and/or the frame period $1002_3$ via a time parameter. Accordingly, the durations of the frame period $1002_1$, the frame period $1002_2$, and/or the frame period $1002_3$ may vary with time and may be the same as or different from each other. The UE 115 may determine a time parameter associated with the time-varying frame period $1002_1$. The time parameter may indicate a duration of the frame period $1002_1$, which may vary with time. The UE 115 may determine the time parameter associated with the time-varying frame period in various ways, as discussed in relation to aspects of FIG. 8.

Additionally or alternatively, the operators 1001 may use similar techniques as discussed in above in relation to aspects of FIG. 8 to determine to modify the time parameter associated with the time-varying frame periods 1002 and/or to transmit modifications to the time parameter associated with the time-varying frame periods 1002. The likelihood of the operator 1001's LBT resulting in the LBT pass may increase due to the time-varying nature of the frame periods.

Additionally or alternatively, the operator 1001 may specify the durations of the MCOT $1004_1$, the MCOT $1004_2$, and/or the MCOT $1004_3$ via a time parameter. Accordingly, the durations of the MCOT $1004_1$, the MCOT $1004_2$, and/or the MCOT $1004_3$ may vary with time and may be the same as or different from each other. The UE 115 may determine a time parameter associated with the time-varying MCOT $1004_1$ of the frame period $1002_1$. The time parameter may indicate a duration of the MCOT $1004_1$, which may vary with time. The UE 115 may determine the time parameter associated with the time-varying MCOT in various ways, as discussed in relation to aspects of FIG. 6. Additionally or alternatively, the operators 1001 may use similar techniques as discussed in above in relation to aspects of FIG. 6 to determine to modify the time parameter associated with the time-varying MCOTs 1004 and/or to transmit modifications to the time parameter associated with the time-varying MCOTs 1004. The likelihood of the operator 1001's LBT resulting in the LBT pass may increase due to the time-varying nature of the MCOTs of the frame periods.

Additionally or alternatively, the operator 1001 may specify the durations of the MIP $1006_1$, the MIP $1006_2$, and/or the MIP $1006_3$ via a time parameter. Accordingly, the durations of the MIP $1006_1$, the MIP $1006_2$, and/or the MIP $1006_3$ may vary with time and may be the same as or different from each other. The UE 115 may determine a time parameter associated with the time-varying MIP $1006_1$ of the frame period $1002_1$. The time parameter may indicate a duration of the MIP $1006_1$, which may vary with time. The UE 115 may determine the time parameter associated with the time-varying MIP in various ways, as discussed in relation to aspects of FIG. 8. Additionally or alternatively, the operators 1001 may use similar techniques as discussed in above in relation to aspects of FIG. 8 to determine to modify the time parameter associated with the time-varying MIPs 1006 and/or to transmit modifications to the time parameter associated with the time-varying MIPs 1006. The likelihood of the operator 1001's LBT resulting in the LBT pass may increase due to the time-varying nature of the MIPs of the frame periods.

Limitations may be imposed on the time-varying MCOTs of the frame periods and/or the time-varying MIPs of the frame periods of the time-varying frame pattern 1000. In some aspects, the operator 1001 may determine the MIP per frame period, where the MIP per frame period is greater than a time threshold. The time threshold may be, for example, 100 microseconds (μs) or about 100 μs. In some aspects, the operator 1001 may determine the fixed MCOT-to-MIP ratio per frame period, where the MIP of the frame period is greater than a percentage threshold of MCOT of the frame period. The percentage threshold may be, for example, five percent or about five percent.

In some aspects, the operator may communicate a communication signal during the frame period based on the modification to the time parameter associated with the frame period and/or the modification to the time parameter associated with at least one of an MCOT of a frame period or an MIP of the frame period. In some aspects, the operator 1001 may transmit to the UE 115, a modification to a time parameter associated with the frame period, where a sum of a first number of time-varying frame periods is fixed.

Figure 11:
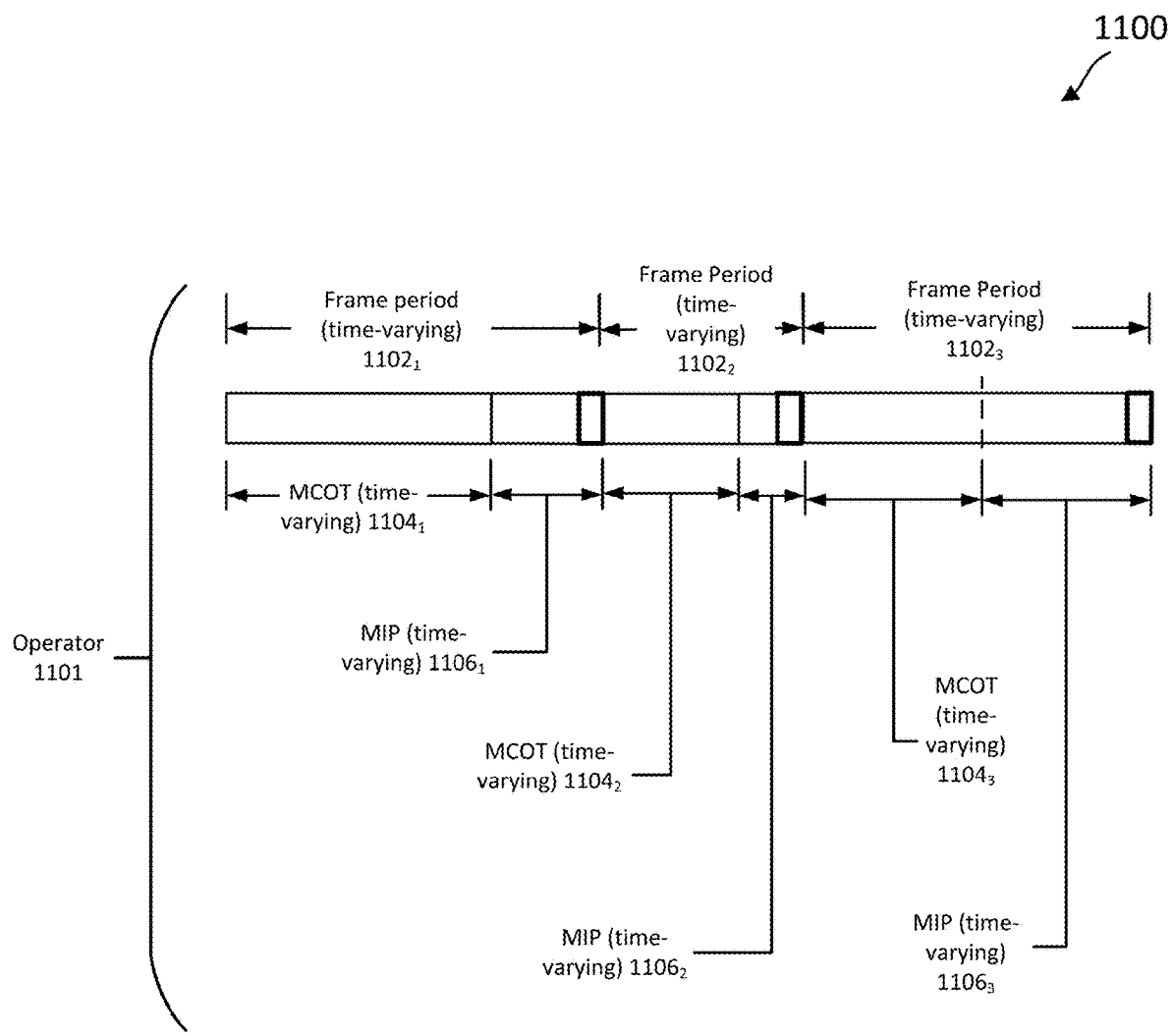
FIG. 11 illustrates a time-varying frame pattern according to one or more aspects of the present disclosure.

FIG. 11 illustrates a time-varying frame pattern 1100 according to one or more aspects of the present disclosure. The time-varying frame pattern 1100 may be employed by BSs such as the BSs 105 and UEs such as the UEs 115 in a network such as the network 110 for communications. In particular, the BS 105 may communicate with the UE 115 using the time-varying frame pattern 1100. Additionally, the time-varying frame pattern 1100 may correspond to the time-varying frame pattern 510 in FIG. 5. The x-axis represents time in some constant units.

In the example illustrated in FIG. 11, an operator 1101 may share a channel with one or more other operators and may perform LBT before transmitting on the channel. The operators may correspond to a BS (e.g., BSs 105). The time-varying frame pattern 1100 may include time-varying frame periods, time-varying MCOTs of a frame period, time-varying MIPs of the frame period, and/or time-varying MCOT-to-MIP ratios of the frame period. In some aspects, the operators are not asynchronized, and a variation of the duration of the frame periods, the duration of the frame periods, the MCOTs, the MIPs, and/or the MCOT-to-MIP ratio may be large such that the operators do not perform LBT at about the same time and accordingly to not attempt to transmit communication signals (e.g., DL and/or UL communication signals) at about the same time. In some aspects, an operator may transmit a modification to a first time parameter associated with a frame period, transmit a modification to a second time parameter associated with an MCOT of the time-varying frame period, transmit a modification to a third time parameter associated with an MIP of the time-varying frame period, and/or transmit a modification to a fourth time parameter associated with an MCOT-to-MIP ratio of the time-varying frame period.

The time-varying frame pattern 1100 may include a time-varying frame period 1102, which may include a time-varying MCOT 1104 and a time-varying MIP 1106. Additionally, the MCOT-to-MIP ratio of each frame period of the time-varying frame pattern 1100 may vary with time. The operator 1101 may perform LBT during the time-varying MIPs 1106.

The operator 1101 may specify the durations of the frame period $1102_1$, the frame period $1102_2$, and/or the frame period $1102_3$ via a time parameter. Accordingly, the durations of the frame period $1102_1$, the frame period $1102_2$, and/or the frame period $1102_3$ may vary with time and may be the same as or different from each other. The UE 115 may determine a time parameter associated with the time-varying frame period $1102_1$. The time parameter may indicate a duration of the frame period $1102_1$, which may vary with time. The UE 115 may determine the time parameter associated with the time-varying frame period in various ways, as discussed in relation to aspects of FIG. 8. Additionally or alternatively, the operators 1101 may use similar techniques as discussed in above in relation to aspects of FIG. 8 to determine to modify the time parameter associated with the time-varying frame periods 1102 and/or to transmit modifications to the time parameter associated with the time-varying frame periods 1102. The likelihood of the operator 1101's LBT resulting in the LBT pass may increase due to the time-varying nature of the frame periods.

Additionally or alternatively, the operator 1101 may specify the durations of the MCOT $1104_1$, the MCOT $1104_2$, and/or the MCOT $1104_3$ via a time parameter. Accordingly, the durations of the MCOT $1104_1$, the MCOT $1104_2$, and/or the MCOT $1104_3$ may vary with time and may be the same as or different from each other. The UE 115 may determine a time parameter associated with the time-varying MCOT $1104_1$ of the frame period $1102_1$. The time parameter may indicate a duration of the MCOT $1104_1$, which may vary with time. The UE 115 may determine the time parameter associated with the time-varying MCOT in various ways, as discussed in relation to aspects of FIG. 6. Additionally or alternatively, the operators 1101 may use similar techniques as discussed in above in relation to aspects of FIG. 6 to determine to modify the time parameter associated with the time-varying MCOTs 1104 and/or to transmit modifications to the time parameter associated with the time-varying MCOTs 1104. The likelihood of the operator 1101's LBT resulting in the LBT pass may increase due to the time-varying nature of the MCOTs of the frame periods.

Additionally or alternatively, the operator 1101 may specify the durations of the MIP $1106_1$, the MIP $1106_2$, and/or the MIP $1106_3$ via a time parameter. Accordingly, the durations of the MIP $1106_1$, the MIP $1106_2$, and/or the MIP $1106_3$ may vary with time and may be the same as or different from each other. The UE 115 may determine a time parameter associated with the time-varying MIP $1106_1$ of the frame period $1102_1$. The time parameter may indicate a duration of the MIP $1106_1$, which may vary with time. The UE 115 may determine the time parameter associated with the time-varying MIP in various ways, as discussed in relation to aspects of FIG. 8. Additionally or alternatively, the operators 1101 may use similar techniques as discussed in above in relation to aspects of FIG. 8 to determine to modify the time parameter associated with the time-varying MIPs 1106 and/or to transmit modifications to the time parameter associated with the time-varying MIPs 1106. The likelihood of the operator 1101's LBT resulting in the LBT pass may increase due to the time-varying nature of the MIPs of the frame periods.

Additionally or alternatively, the operator 1101 may specify the MCOT-to-MIP ratios of the frame periods $1102_1$, $1102_2$, and $1102_3$ via a time parameter. Accordingly, the MCOT-to-MIP ratios of the frame periods $1102_1$, $1102_2$, and $1102_3$ may vary with time and may be the same as or different from each other. The UE 115 may determine a time parameter associated with the MCOT-to-MIP ratio of the frame period $1102_1$. The UE 115 may determine the time parameter associated with the MCOT-to-MIP ratio in various ways, as discussed in relation to aspects of FIG. 6. Additionally or alternatively, the operators 1101 may use similar techniques as discussed in above in relation to aspects of FIG. 6 to determine to modify the time parameter associated with the time-varying MCOT-to-MIP ratio and/or to transmit modifications to the time parameter associated with the time-varying MCOT-to-MIP ratio. The likelihood of the operator 1101's LBT resulting in the LBT pass may increase due to the time-varying nature of the MCOT-to-MIP ratio of the frame periods.

Limitations may be imposed on the time-varying MCOTs of the frame periods and/or the time-varying MIPs of the frame periods of the time-varying frame pattern 1100. In some aspects, the operator 1101 may determine the MIP per frame period, where the MIP per frame period is greater than a time threshold. The time threshold may be, for example, 110 microseconds (µs) or about 110 µs. In some aspects, the operator 1101 may determine the MCOT-to-MIP ratio per frame period, where average of the MIP per K frame periods is greater than a percentage threshold of an average of the MCOT per K frame periods, and K is a number greater than one. The percentage threshold may be, for example, five percent or about five percent.

In some aspects, the operator may communicate a communication signal during the frame period based on the modification to the time parameter associated with the frame period, the modification to the time parameter associated with the MCOT-to-MIP ratio, and/or the modification to the time parameter associated with at least one of an MCOT of a frame period or an MIP of the frame period.

Limitations may be imposed on the time-varying MCOTs and/or the fixed MIPs of the frame periods of the time-varying frame pattern 1000. In some aspects, the operator 1001 may determine the fixed MIP per frame period, where the MIP per frame period is greater than a time threshold. The time threshold may be, for example, 100 microseconds (µs) or about 100 µs. In some aspects, the operator 1001 may determine the MCOT per frame period, where the fixed MIP is greater than a percentage threshold an average of the MCOT per K frame periods, and K is a number greater than one. The percentage threshold may be, for example, five percent or about five percent.

In some aspects, the operator may transmit a modification to a time parameter associated with a ratio of the MCOT to the MIP. The operator may communicate a communication signal during the frame period based on the modification to the time parameter associated with the ratio and/or the modification to the time parameter associated with at least one of an MCOT of a frame period or the frame period. In some aspects, the operator 1101 may transmit to the UE 115, a modification to a time parameter associated with the frame period, where a sum of a first number of time-varying frame periods is fixed.

In some aspects, the operators do not coordinate amongst each other. Accordingly, there is still a possibility that two operators may continue to collide with each or one operator starves another operator from transmitting communication signals in the channel. Additionally or alternatively, in the single-operator scenario, the interference from an unknown source may be periodic and its period may be similar to the FBE-frame period. It may be desirable for the network (e.g., the BS) to modify the FBE-frame pattern based on the interference environment.

Figure 12:
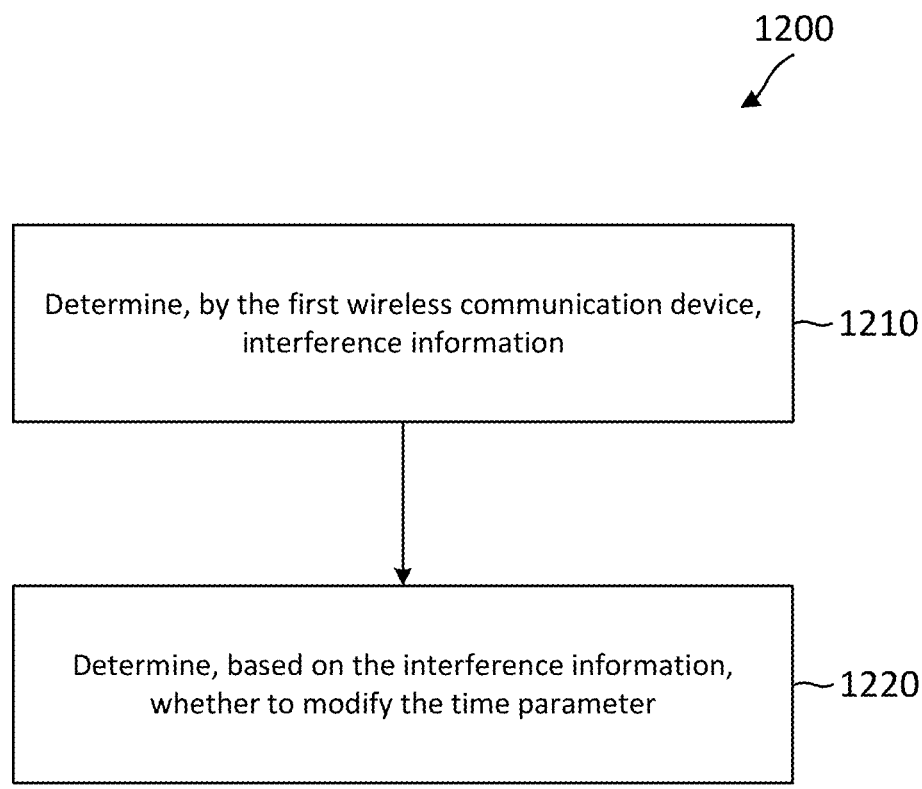
FIG. 12 is a flow diagram of a communication method for modifying an FBE-frame pattern based on an interference environment according to one or more aspects of the present disclosure.

FIG. 12 is a flow diagram of a communication method 1200 for modifying an FBE-frame pattern based on the interference environment according to one or more aspects of the present disclosure. Blocks of the method 1200 can be executed by a computing device (e.g., a processor, processing circuit, and/or other suitable component) of a wireless communication device. In some aspects, the wireless communication device is a BS (e.g., BSs 105 and/or BS 300) that may utilize one or more components, such as the processor 302, the memory 304, the modification module 308, the communication module 309, the transceiver 310, and/or the antennas 316 to execute the blocks of the method 1200. In some aspects, the wireless communication device is a UE (e.g., UEs 115 and/or UE 400) that may utilize one or more components, such as the processor 402, the memory 404, the modification module 408, the communication module 409, the transceiver 410, and/or the antennas 416 to execute the blocks of the method 1200. The method 1200 may employ similar mechanisms as in the FBE scheme 200 in FIG. 2, the various time-varying frame patterns in the table 500 in FIG. 5, the time-varying frame pattern 600 in FIG. 6, the time-varying frame pattern 700 in FIG. 7, the time-varying frame pattern 800 in FIG. 8, the time-varying frame pattern 900 in FIG. 9, the time-varying frame pattern 1000 in FIG. 10, and/or the time-varying frame pattern 1100 in FIG. 11. As illustrated, the method 1200 includes a number of enumerated blocks, but aspects of the method 1200 may include additional blocks before, after, and/or in between the enumerated blocks. In some aspects, one or more of the enumerated blocks may be omitted or performed in a different order.

At block 1210, the method 1200 includes determining, by the first wireless communication device, interference information. At block 1220, the method 1200 includes determining, based on the interference information, whether to modify the time parameter.

In an example, the first wireless communication device is a BS 105, and the second wireless communication device is a UE 115. The BS 105 may determine the interference information by detecting the interference information (e.g., via an LBT procedure as discussed in the present disclosure). In another example, the first wireless communication device is a UE 115, and the second wireless communication device is BS 105. The UE 115 may detect the interference information and transmit a report including the interference information to the BS 105. The BS 105 may determine the interference information by receiving the interference information (e.g., in a report including the interference information) from the UE 115 and determine whether to modify the time parameter based on the interference information in the report.

The interference information may include an LBT result history including, for example, an LBT success rate and/or LBT failure rate. In some aspects, a BS 105 may perform a number of LBTs over time (e.g., for different frame periods) and store the result of each LBT as an LBT result history (e.g., in a memory such as the memory 304). The BS 105 may determine, based on the LBT result history, whether an LBT success rate is less than a performance threshold during a time period. The BS 105 may determine to modify the time parameter in response to a determination that the LBT success rate is less than the performance threshold during the time period. In some aspects, a BS 105 may determine, based on the LBT result history, whether an LBT procedure has failed M times in succession, where M is a number greater than one. The BS 105 may determine to modify the time parameter in response to a determination that the LBT procedure has failed M times in succession.

Additionally or alternatively, the interference information may include a data reception performance between the first and second wireless communication devices. The data reception performance may indicate a first measurement in a first frequency band and a second measurement in a second frequency band. In some aspects, the first frequency band may include one of an unlicensed band or a licensed band, and the second frequency band may include the other of the unlicensed band or the licensed band. In some aspects, the first frequency band is different from the second frequency band. In some aspects, the first frequency band is the same as the second frequency band.

The BS 105 may determine whether interference is present in an unlicensed band. In some aspects, the BS 105 may determine a first measurement on a first frequency band and a second measurement on a second frequency band. The first frequency band may be an unlicensed band, and the second frequency band may be an unlicensed band or a licensed band. The BS 105 may compare the first and second measurements and determine whether interference is present in the unlicensed band based on the comparison. In some aspects, the BS 105 may compare the past and current measurements on an unlicensed band to determine whether interference is present in the unlicensed band. For example, the BS 105 may determine a first measurement at time T0 and a second measurement at time T1 on the unlicensed band, where time T0 precedes time T1. The BS 105 may compare the first and second measurements and determine whether interference is present in the unlicensed band based on the comparison.

A first communication associated with the first measurement may be received before or after a second communication associated with the second measurement, and the first wireless communication device may compare the first and second measurements between the past and the present in the (same) unlicensed frequency band. The first wireless communication device may determine to modify the time parameter in response to a determination that the first measurement is lower than the second measurement. The first wireless communication device may determine to modify the time parameter in response to a determination that the first measurement is greater than the second measurement.

The first wireless communication device may determine to modify the time parameter based on a comparison of the first measurement and the second measurement. In some aspects, the first measurement includes a signal-to-noise ratio (SINR) of at least one of a first PDCCH or a first PDSCH, and the second measurement includes an SINR of at least one of a second PDCCH or a second PDSCH. In some aspects, the first measurement may include an SINR of at least one of a first PUCCH or a first PUSCH, and the second measurement includes an SINR of at least one of a second PUCCH or a second PUSCH. In some aspects, the first measurement includes a first NACK performance metric associated with the first frequency band, and the second measurement includes a second NACK performance metric associated with the second frequency band. In some instances, the first NACK performance metric may include a first percentage of NACKs associated with the first frequency band, and the second NACK performance metric may include a second percentage of NACKs associated with the second frequency band. In some instances, the first NACK performance metric may include a first number of NACKs communicated (e.g., transmitted or received) over a time period, and the second NACK performance metric may include a second number of NACKs communicated (e.g., transmitted or received) over the time period. The first number of NACKs and/or the second number of NACKs may be consecutive or non-consecutive NACKs and may be based on one HARQ process or over all HARQ processes. In some aspects, the first measurement includes a first MCS associated with a first communication in the first frequency band, and the second measurement includes a second MCS associated with a second communication in the second frequency band. In some aspects, the first measurement includes a first decoding failure rate associated with the first frequency band, and the second measurement includes a second decoding failure rate associated with the second frequency band.

It may be undesirable to modify the FBE-frame pattern too frequently. In some aspects, the BS 105 does not change the FBE-frame structure within T ms (e.g., about 200 ms).

Figure 13:
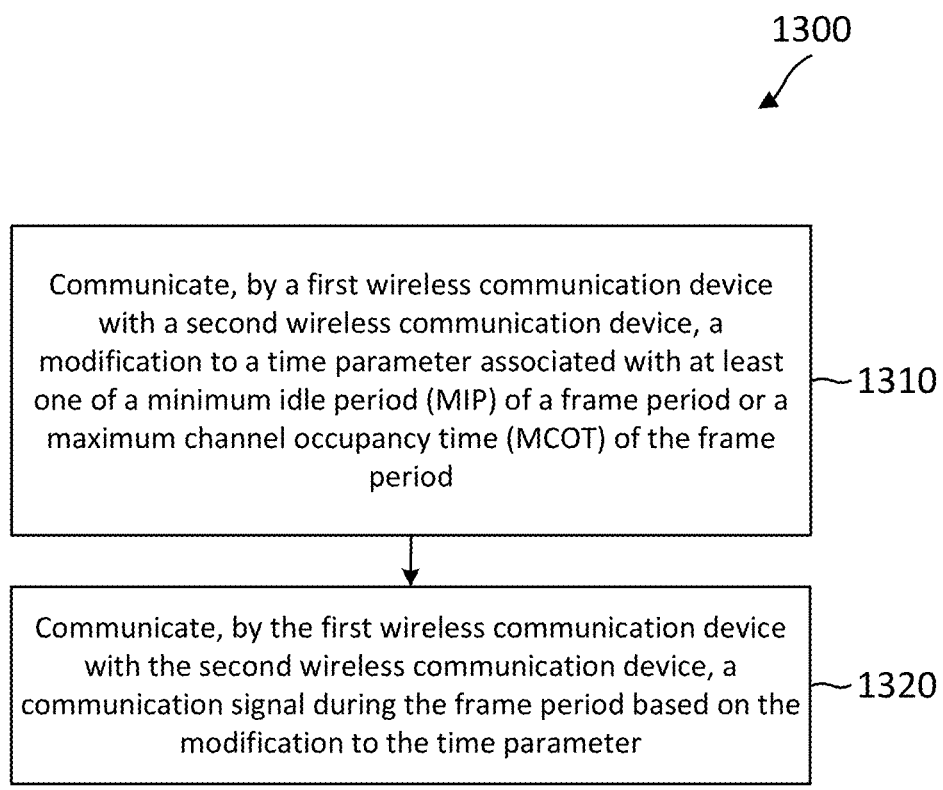
FIG. 13 is a flow diagram of a communication method for modifying a time parameter associated with an FBE-frame pattern according to one or more aspects of the present disclosure.

FIG. 13 is a flow diagram of a communication method 1300 for modifying a time parameter associated with an FBE-frame pattern according to one or more aspects of the present disclosure. Blocks of the method 1300 can be executed by a computing device (e.g., a processor, processing circuit, and/or other suitable component) of a wireless communication device. In some aspects, the wireless communication device is a BS (e.g., BSs 105 and/or BS 300) that may utilize one or more components, such as the processor 302, the memory 304, the modification module 308, the communication module 309, the transceiver 310, and/or the antennas 316 to execute the blocks of the method 1300. In some aspects, the wireless communication device is a UE (e.g., UEs 115 and/or UE 400) that may utilize one or more components, such as the processor 402, the memory 404, the modification module 408, the communication module 409, the transceiver 410, and/or the antennas 416 to execute the blocks of the method 1300. The method 1300 may employ similar mechanisms as in the FBE scheme 200 in FIG. 2, the various time-varying frame patterns in the table 500 in FIG. 5, the time-varying frame pattern 600 in FIG. 6, the time-varying frame pattern 700 in FIG. 7, the time-varying frame pattern 800 in FIG. 8, the time-varying frame pattern 900 in FIG. 9, the time-varying frame pattern 1000 in FIG. 10, the time-varying frame pattern 1100 in FIG. 11, and/or the method of 1200 in FIG. 12. As illustrated, the method 1300 includes a number of enumerated blocks, but aspects of the method 1300 may include additional blocks before, after, and/or in between the enumerated blocks. In some aspects, one or more of the enumerated blocks may be omitted or performed in a different order.

At block 1310, the method 1300 includes communicating, by a first wireless communication device with a second wireless communication device, a modification to a time parameter associated with at least one of an MIP of a frame period or an MCOT of the frame period. The first wireless communication device may communicate the modification to the time parameter as discussed in relation to, for example, aspects of FIGS. 1, 2, 3, 4, 5, 6, 7, 8, 9, 10, 11, and/or 12.

In some instances, the first wireless communication device is a BS 105, and the second wireless communication device is a UE 115. The BS 105 may communicate the modification by transmitting the modification to the time parameter to the UE 115. The BS 105 may determine and transmit any of the time-varying frame patterns provided in the table 500 in FIG. 5 (e.g., the time-varying frame pattern 600 in FIG. 6, the time-varying frame pattern 700 in FIG. 7, the time-varying frame pattern 800 in FIG. 8, the time-varying frame pattern 900 in FIG. 9, the time-varying frame pattern 1000 in FIG. 10, and/or the time-varying frame pattern 1100 in FIG. 11) to the UE 115. The BS 105 may execute the communication method 1200 in FIG. 12, and/or the communication method 1300 in FIG. 13.

In some instances, the first wireless communication device is a UE 115, and the second wireless communication device is a BS 105. The UE 115 may communicate the modification by receiving the modification to the time parameter from the BS 105. The UE 115 may receive and determine any of the time-varying frame patterns provided in the table 500 in FIG. 5 (e.g., the time-varying frame pattern 600 in FIG. 6, the time-varying frame pattern 700 in FIG. 7, the time-varying frame pattern 800 in FIG. 8, the time-varying frame pattern 900 in FIG. 9, the time-varying frame pattern 1000 in FIG. 10, and/or the time-varying frame pattern 1100 in FIG. 11). pattern 1000 in FIG. 10, and/or the time-varying frame pattern 1100 in FIG. 11) to the UE 115. The UE 115 may execute the communication method 1200 in FIG. 12, and/or the communication method 1300 in FIG. 13.

At block 1320, the method 1300 includes communicating, by the first wireless communication device with the second wireless communication device, a communication signal during the frame period based on the modification to the time parameter. In some instances, the first wireless communication device is a BS 105, and the second wireless communication device is a UE 115. The BS 105 may communicate the communication signal by transmitting the communication signal to the UE 115 as discussed in relation to, for example, aspects of FIGS. 1, 2, 5, 6, 7, 8, 9, 10, 11, and/or 12. In some instances, the first wireless communication device is a UE 115, and the second wireless communication device is a BS 105. The UE 115 may communicate the communication signal by receiving the communication signal from the BS 105 as discussed in relation to, for example, aspects of FIGS. 1, 2, 5, 6, 7, 8, 9, 10, 11, and/or 12.

In some aspects, a method of wireless communication includes: communicating, by a first wireless communication device with a second wireless communication device, a modification to a time parameter associated with at least one of a minimum idle period (MIP) of a frame period or a maximum channel occupancy time (MCOT) of the frame period; and communicating, by the first wireless communication device with the second wireless communication device, a communication signal during the frame period based on the modification to the time parameter. In some examples, communicating a modification to a time parameter includes communicating a modification to a first time parameter associated with the MIP of the frame period and communicating a modification to a second time parameter associated with the MCOT of the frame period. In some cases, the method of wireless communication further includes determining the MIP per frame period, where the MIP per frame period is greater than a time threshold. In some cases, the method of wireless communication further includes determining the MIP per frame period, where an average of the MIP per K frame periods is greater than a percentage threshold of an average of the MCOT per K frame periods, where K is a number greater than one. In some examples, the frame period is fixed.

In some cases, the method of wireless communication further includes communicating a modification to a third time parameter associated with a ratio of the MCOT to the MIP, where communicating the communication signal includes communicating the communication signal during the frame period based on the modification to the third time parameter. In some examples, communicating the modification to the time parameter includes communicating a modification to the time parameter associated with the MIP of the frame period, where the MCOT of the frame period is fixed.

In some cases, the method of wireless communication further includes determining the MIP per frame period, where the MIP per frame period is greater than a time threshold. In some cases, the method of wireless communication further includes determining the MIP per frame period, where an average of the MIP per K frame periods is greater than a percentage threshold of the fixed MCOT, and where K is a number greater than one. In some cases, the method of wireless communication further includes communicating, by the first wireless communication device with the second wireless communication device, a modification to a second time parameter associated with the frame period. In some examples, communicating the modification to the time parameter includes communicating a modification to the time parameter associated with the MCOT of the frame period, where the MIP of the frame period is fixed. In some cases, the method of wireless communication further includes determining the fixed MIP per frame period, where the MIP per frame period is greater than a time threshold. In some cases, the method of wireless communication further includes determining the MCOT per frame period, where the fixed MIP is greater than a percentage threshold of an average of the MCOT per K frame periods, and where K is a number greater than one. In some cases, the method of wireless communication further includes communicating, by the first wireless communication device with the second wireless communication device, a modification to a second time parameter associated with the frame period.

In some examples, communicating the modification to the time parameter includes communicating a modification to a first time parameter associated with the MIP of the frame period and communicating a modification to a second time parameter associated with the MCOT of the frame period, wherein a ratio of the MCOT to the MIP per frame period is fixed. In some cases, the method of wireless communication further includes determining the MIP per frame period, where the MIP per frame period is greater than a time threshold. In some cases, the method of wireless communication further includes determining the ratio of the MCOT to the MIP of the frame period, where the MIP of the frame period is greater than a percentage threshold of the MCOT of the frame period. In some cases, the method of wireless communication further includes communicating, by the first wireless communication device with the second wireless communication device, a second modification to a third time parameter associated with the frame period.

In some examples, communicating the modification to the time parameter includes communicating a modification to a first time parameter associated with the MIP of the frame period and communicating a modification to a second time parameter associated with the MCOT of the frame period, where a ratio of the MCOT to the MIP is based on a third time parameter. In some cases, the method of wireless communication further includes determining the MIP per frame period, where the MIP per frame period is greater than a time threshold. In some cases, the method of wireless communication further includes determining the ratio of the MCOT to the MIP of the frame period, where an average of the MIP per K frame periods is greater than a percentage threshold of an average of the MCOT per K frame periods, and where K is a number greater than one. In some cases, the method of wireless communication further includes communicating, by the first wireless communication device with the second wireless communication device, a modification to a third time parameter associated with the frame period.

In some examples, the first wireless communication device is a BS, and communicating the modification includes transmitting the modification via remaining minimum system information (RMSI). In some examples, the first wireless communication device is a BS, and communicating a modification includes transmitting the modification via a UE-specific radio resource control (RRC) message. In some examples, the method of wireless communication further includes: determining, by the first wireless communication device, interference information; and determining, based on the interference information, whether to modify the time parameter. In some cases, determining interference information includes detecting the interference information. In some cases, determining interference information includes receiving a reporting including the interference information. In some examples, the interference information includes a listen-before-talk (LBT) result history. In some cases, the method of wireless communication further includes: determining, based on the LBT result history, whether an LBT success rate is less than a performance threshold during a time period; and determining, by the first wireless communication device, to modify the time parameter in response to a determination that the LBT success rate is less than the performance threshold during the time period. In some cases, the method of wireless communication further includes: determining, based on the LBT result history, whether an LBT procedure has failed M times in succession, where M is a number greater than one; and determining, by the first wireless communication device, to modify the time parameter in response to a determination that the LBT procedure has failed M times in succession. In some cases, the interference information includes a data reception performance between the first and second wireless communication devices.

In some examples, the data reception performance indicates a first measurement in a first frequency band and a second measurement in a second frequency band, the method further including: determining, by the first wireless communication device, to modify the time parameter based on a comparison of the first measurement and the second measurement. In some cases, the first frequency band includes one of an unlicensed band or a licensed band, and the second frequency band includes the other of the unlicensed band or the licensed band. In some cases, the first measurement includes a signal-to-noise ratio (SINR) of at least one of a first physical downlink control channel (PDCCH) or a first physical downlink shared channel (PDSCH), and the second measurement includes an SINR of at least one of a second PDCCH or a second PDSCH. In some cases, the first measurement includes an SINR of at least one of a first physical uplink control channel (PUCCH) or a first physical uplink shared channel (PUSCH), and the second measurement includes an SINR of at least one of a second PUCCH or a second PUSCH. In some cases, the first measurement includes a first NACK performance metric associated with the first frequency band, and the second measurement includes a second NACK performance associated with the second frequency band. In some cases, the first measurement includes a first modulation and coding scheme (MCS) associated with a first communication in the first frequency band, and the second measurement includes a second MCS associated with a second communication in the second frequency band. In some cases, the first measurement includes a first decoding failure rate associated with the first frequency band, and the second measurement includes a second decoding failure rate associated with the second frequency band. In some cases, the first frequency band is different from the second frequency band. In some cases, the first frequency band is the same as the second frequency band.

In some examples, the method of wireless communication further includes: communicating, by the first wireless communication device with the second wireless communication device, an MIP pattern including a first MIP of a first set of frame periods and a second MIP of a second set of frame periods, where the communicating a modification to a time parameter includes communicating the modification to the time parameter associated with at least one of the first MIP or the first set of frame periods; and communicating, by the first wireless communication device with the second wireless communication device, communication signals during the first and second sets of frame periods based on the MIP pattern. In some cases, the first MIP has a longer duration than the second MIP. In some examples, the method of wireless communication further includes: communicating, by the first wireless communication device with the second wireless communication device, an MCOT pattern including a first MCOT of a first set of frame periods and a second MCOT of a second set of frame periods, where the communicating a modification to a time parameter includes communicating the modification to the time parameter associated with at least one of the first MCOT or the first set of frame periods; and communicating, by the first wireless communication device with the second wireless communication device, communication signals during the first and second sets of frame periods based on the MCOT pattern. In some cases, the first MCOT has a longer duration than the second MCOT. In some examples, the method of wireless communication further includes communicating, by the first wireless communication device with the second wireless communication device, a second modification to a time parameter associated with the frame period, where a sum of a first number of time-varying frame periods is fixed.

In some aspects, an apparatus includes a transceiver configured to: communicate, by a first wireless communication device with a second wireless communication device, a modification to a time parameter associated with at least one of a minimum idle period (MIP) of a frame period or a maximum channel occupancy time (MCOT) of the frame period; and communicate, by the first wireless communication device with the second wireless communication device, a communication signal during the frame period based on the modification to the time parameter. In some cases, the transceiver communicates a modification to a first time parameter associated with the MIP of the frame period and communicates a modification to a second time parameter associated with the MCOT of the frame period. In some cases, the transceiver communicates a modification to the time parameter associated with the MIP of the frame period, and wherein the MCOT of the frame period is fixed. In some cases, the transceiver communicates a modification to a second time parameter associated with the frame period. In some cases, the transceiver communicates a modification to a first time parameter associated with the MIP of the frame period and communicates a modification to a second time parameter associated with the MCOT of the frame period, where a ratio of the MCOT to the MIP per frame period is fixed. In some cases, the transceiver communicates a modification to a first time parameter associated with the MIP of the frame period and communicates a modification to a second time parameter associated with the MCOT of the frame period, where a ratio of the MCOT to the MIP is based on a third time parameter. In some cases, the transceiver communicates the modification via downlink control information (DCI). In some cases, the transceiver communicates the modification via a medium access control-control element (MAC-CE).

In some cases, the apparatus further includes a processor configured to: determine, by the first wireless communication device, interference information; and determine, based on the interference information, whether to modify the time parameter. In some examples, the interference information includes a listen-before-talk (LBT) result history. In some examples, the processor is further configured to: determine, based on the LBT result history, whether an LBT success rate is less than a performance threshold during a time period; and determine, by the first wireless communication device, to modify the time parameter in response to a determination that the LBT success rate is less than the performance threshold during the time period. In some cases, the processor is further configured to: determine, based on the LBT result history, whether an LBT procedure has failed M times in succession, wherein M is a number greater than one; and determine, by the first wireless communication device, to modify the time parameter in response to a determination that the LBT procedure has failed M times in succession.

In some examples, the interference information includes a data reception performance between the first and second wireless communication devices, and the data reception performance indicates a first measurement in a first frequency band and a second measurement in a second frequency band, where the processor is configured to determine, by the first wireless communication device, to modify the time parameter based on a comparison of the first measurement and the second measurement. In some examples, the first frequency band includes an unlicensed band, and the second frequency band includes one of the unlicensed band or the licensed band. In some examples, the first measurement includes a signal-to-noise ratio (SINR) of at least one of a first physical downlink control channel (PDCCH) or a first physical downlink shared channel (PDSCH), and the second measurement includes an SINR of at least one of a second PDCCH or a second PDSCH. In some examples, the first measurement includes an SINR of at least one of a first physical uplink control channel (PUCCH) or a first physical uplink shared channel (PUSCH), and the second measurement includes an SINR of at least one of a second PUCCH or a second PUSCH. In some examples, the first measurement includes a first negative-acknowledgement (NACK) performance metric associated with the first frequency band, and the second measurement includes a second NACK performance associated with the second frequency band. In some examples, the first measurement includes a first modulation and coding scheme (MCS) associated with a first communication in the first frequency band, and the second measurement includes a second MCS associated with a second communication in the second frequency band. In some examples, the first measurement includes a first decoding failure rate associated with the first frequency band, and the second measurement includes a second decoding failure rate associated with the second frequency band. In some examples, the first frequency band is different from the second frequency band. In some examples, the first frequency band is the same as the second frequency band.

In some examples, the transceiver is further configured to: communicate, by the first wireless communication device with the second wireless communication device, an MIP pattern including a first MIP of a first set of frame periods and a second MIP of a second set of frame periods; communicate, by the first wireless communication device with the second wireless communication device, the modification to the time parameter associated with at least one of the first MIP or the first set of frame periods; and communicate, by the first wireless communication device with the second wireless communication device, communication signals during the first and second sets of frame periods based on the MIP pattern. In some cases, the first MIP has a longer duration than the second MIP. In some examples, the transceiver is further configured to: communicate, by the first wireless communication device with the second wireless communication device, an MCOT pattern including a first MCOT of a first set of frame periods and a second MCOT of a second set of frame periods; communicate the modification to the time parameter associated with at least one of the first MCOT or the first set of frame periods; and communicate, by the first wireless communication device with the second wireless communication device, communication signals during the first and second sets of frame periods based on the MCOT pattern. In some cases, the first MCOT has a longer duration than the second MCOT. In some examples, the transceiver is further configured to communicate, by the first wireless communication device with the second wireless communication device, a second modification to a time parameter associated with the frame period, where a sum of a first number of time-varying frame periods is fixed.

In some aspects, a computer-readable medium having program code recorded thereon, the program code including: code for causing a first wireless communication device to communicate with a second wireless communication device, a modification to a time parameter associated with at least one of a minimum idle period (MIP) of a frame period or a maximum channel occupancy time (MCOT) of the frame period; and code for causing the first wireless communication device to communicate with the second wireless communication device, a communication signal during the frame period based on the modification to the time parameter. In some examples, the program code further includes: code for causing the first wireless communication device to determine interference information; and code for causing the first wireless communication device to determine, based on the interference information, whether to modify the time parameter. In some cases, the interference information includes a listen-before-talk (LBT) result history. In some examples, the program code further includes: code for causing the first wireless communication device to determine, based on the LBT result history, whether an LBT success rate is less than a performance threshold during a time period; and code for causing the first wireless communication device to determine to modify the time parameter in response to a determination that the LBT success rate is less than the performance threshold during the time period. In some examples, the program code further includes: code for causing the first wireless communication device to determine, based on the LBT result history, whether an LBT procedure has failed M times in succession, wherein M is a number greater than one; and code for causing the first wireless communication device to determine to modify the time parameter in response to a determination that the LBT procedure has failed M times in succession. In some cases, the interference information includes a data reception performance between the first and second wireless communication devices, and the data reception performance indicates a first measurement in a first frequency band and a second measurement in a second frequency band, the program code further including: code for causing the first wireless communication device to determine to modify the time parameter based on a comparison of the first measurement and the second measurement.

In some aspects, an apparatus includes: means for communicating, with a second wireless communication device, a modification to a time parameter associated with at least one of a minimum idle period (MIP) of a frame period or a maximum channel occupancy time (MCOT) of the frame period; and means for communicating, with the second wireless communication device, a communication signal during the frame period based on the modification to the time parameter. In some examples, the apparatus further includes means for communicating, with a second wireless communication device, a modification to a third time parameter associated with a ratio of the MCOT to the MIP, where the means for communicating a communication signal includes means for communicating the communication signal during the frame period based on the modification to the third time parameter. In some cases, the apparatus further includes means for communicating, with a second wireless communication device, a modification to a third time parameter associated with the frame period, where the means for communicating a communication signal includes means for communicating the communication signal during the frame period based on the modification to the third time parameter. In some cases, the apparatus further includes means for determining, by the first wireless communication device, interference information; and means for determining, based on the interference information, whether to modify the time parameter.

Information and signals may be represented using any of a variety of different technologies and techniques. In some aspects, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. Due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (e.g., a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication performed by a first wireless communication device, the method comprising:
    determining, based on interference information, to modify a time parameter;
    communicating, with a second wireless communication device based on the determining to modify the time parameter, a modification to the time parameter associated with a minimum idle period (MIP) of a frame period, the frame period including the MIP and a maximum channel occupancy time (MCOT); and
    communicating, with the second wireless communication device, a communication signal during the MCOT based on the modification to the time parameter.

2. The method of claim 1, wherein the communicating the modification to the time parameter includes communicating a modification to a first time parameter associated with a duration of the MIP of the frame period.

3. The method of claim 2, wherein the frame period is fixed.

4. The method of claim 3, further comprising:
    communicating a modification to a second time parameter associated with a ratio of the MCOT to the MIP, wherein the communicating the communication signal includes communicating the communication signal during the MCOT based on the modification to the second time parameter.

5. The method of claim 3, wherein the MIP follows the MCOT, and the duration of the MIP is based on the modification to the first time parameter.

6. The method of claim 1, wherein the MCOT of the frame period is fixed.

7. The method of claim 6, further comprising:
    communicating, with the second wireless communication device, a modification to a second time parameter associated with the frame period.

8. The method of claim 1, wherein the first wireless communication device is a base station (BS), and wherein the communicating the modification includes transmitting the modification via at least one of remaining minimum system information (RMSI) or a UE-specific radio resource control (RRC) message.

9. The method of claim 1, wherein the interference information includes a listen-before-talk (LBT) result history, the method further comprising:
    determining, based on the LBT result history, whether an LBT success rate is less than a performance threshold during a time period; and determining to modify the time parameter in response to a determination that the LBT success rate is less than the performance threshold during the time period.

10. The method of claim 1, wherein the interference information includes a listen-before-talk (LBT) result history, the method further comprising:
determining, based on the LBT result history, whether an LBT procedure has failed M times in succession, wherein M is a number greater than one; and
determining to modify the time parameter in response to a determination that the LBT procedure has failed M times in succession.

11. The method of claim 1, wherein the interference information includes a data reception performance between the first and second wireless communication devices, and wherein the data reception performance indicates a first measurement in a first frequency band and a second measurement in a second frequency band, the method further comprising:
determining to modify the time parameter based on a comparison of the first measurement and the second measurement.

12. The method of claim 11, wherein the first frequency band includes one of an unlicensed band or a licensed band, and the second frequency band includes the other of the unlicensed band or the licensed band.

13. The method of claim 12, wherein the first measurement includes a signal-to-noise ratio (SINR) of at least one of a first physical downlink control channel (PDCCH) or a first physical downlink shared channel (PDSCH), and the second measurement includes an SINR of at least one of a second PDCCH or a second PDSCH.

14. The method of claim 12, wherein the first measurement includes an SINR of at least one of a first physical uplink control channel (PUCCH) or a first physical uplink shared channel (PUSCH), and the second measurement includes an SINR of at least one of a second PUCCH or a second PUSCH.

15. The method of claim 12, wherein the first measurement includes a first negative acknowledgement (NACK) performance metric associated with the first frequency band, and the second measurement includes a second NACK performance associated with the second frequency band.

16. The method of claim 12, wherein the first measurement includes a first modulation and coding scheme (MCS) associated with a first communication in the first frequency band, and the second measurement includes a second MCS associated with a second communication in the second frequency band.

17. The method of claim 12, wherein the first measurement includes a first decoding failure rate associated with the first frequency band, and the second measurement includes a second decoding failure rate associated with the second frequency band.

18. A first wireless communication device, comprising:
a memory;
a transceiver; and
at least one processor coupled to the memory and the transceiver, wherein the first wireless communication device is configured to:
determine, based on interference information, to modify a time parameter;
communicate, with a second wireless communication device based on interference information the determining to modify the time parameter, a modification to the time parameter associated with a minimum idle period (MIP) of a frame period, wherein the frame period includes the MIP and a maximum channel occupancy time (MCOT); and
communicate, with the second wireless communication device, a communication signal during the MCOT based on the modification to the time parameter.

19. The first wireless communication device of claim 18, wherein the first wireless communication device is further configured to communicate a modification to a first time parameter associated with a duration of the MIP of the frame period.

20. The first wireless communication device of claim 19, wherein the frame period is fixed.

21. The first wireless communication device of claim 20, wherein the first wireless communication device is further configured to:
communicate a modification to a second time parameter associated with a ratio of the MCOT to the MIP; and
communicate the communication signal during the MCOT based on the modification to the second time parameter.

22. The first wireless communication device of claim 18, wherein the MCOT of the frame period is fixed; and
the first wireless communication device is further configured to communicate a modification to a second time parameter associated with the frame period.

23. The first wireless communication device of claim 18, wherein the interference information includes a listen-before-talk (LBT) result history, and wherein the first wireless communication device is further configured to:
determine, based on the LBT result history, whether an LBT success rate is less than a performance threshold during a time period; and
determine to modify the time parameter in response to a determination that the LBT success rate is less than the performance threshold during the time period.

24. The first wireless communication device of claim 18, wherein the interference information includes a listen-before-talk (LBT) result history, and wherein the first wireless communication device is further configured to:
determine, based on the LBT result history, whether an LBT procedure has failed M times in succession, wherein M is a number greater than one; and
determine to modify the time parameter in response to a determination that the LBT procedure has failed M times in succession.

25. A non-transitory computer-readable medium having program code recorded thereon, the program code comprising:
code for causing a first wireless communication device to determine, based on interference information, to modify a time parameter;
code for causing the first wireless communication device to communicate with a second wireless communication device based on the determining to modify the time parameter, a modification to the time parameter associated with a minimum idle period (MIP) of a frame period, wherein the frame period includes the MIP and a maximum channel occupancy time (MCOT); and
code for causing the first wireless communication device to communicate with the second wireless communication device, a communication signal during the MCOT based on the modification to the time parameter.

26. The non-transitory computer-readable medium of claim 25, wherein the code for causing the first wireless communication device to communicate the modification to the time parameter includes code for causing the first wireless communication device to communicate a modification to a first time parameter associated with a duration of the MIP of the frame period and code for causing the first wireless communication device to communicate a modification to a second time parameter associated with a ratio of the MCOT to the MIP, and wherein the frame period is fixed.

27. The non-transitory computer-readable medium of claim 25, wherein the MCOT of the frame period is fixed, the program code further comprising:
  code for causing the first wireless communication device to communicate with the second wireless communication device, a modification to a second time parameter associated with the frame period.

28. A first wireless communication device, comprising:
  means for determining, based on interference information, to modify a time parameter;
  means for communicating, with a second wireless communication device based on the determining to modify the time parameter, a modification to the time parameter associated with a minimum idle period (MIP) of a frame period, wherein the frame period includes the MW and a maximum channel occupancy time (MCOT); and
  means for communicating, with the second wireless communication device, a communication signal during the MCOT based on the modification to the time parameter.

* * * * *